United States Patent
Adogla et al.

(10) Patent No.: US 9,137,110 B1
(45) Date of Patent: Sep. 15, 2015

(54) AVAILABILITY RISK ASSESSMENT, SYSTEM MODELING

(75) Inventors: Eden G. Adogla, Seattle, WA (US); Manish Agarwal, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 324 days.

(21) Appl. No.: 13/587,879

(22) Filed: Aug. 16, 2012

(51) Int. Cl.
G06F 15/173 (2006.01)
H04L 12/24 (2006.01)

(52) U.S. Cl.
CPC .................................. *H04L 41/082* (2013.01)

(58) Field of Classification Search
CPC ... H04L 41/082; H04L 41/5003; H04L 43/08; H04L 47/70; H04L 41/5009
USPC ................................................ 709/223–226
See application file for complete search history.

(56) References Cited

U.S. PATENT DOCUMENTS

| | | | |
|---|---|---|---|
| 5,218,605 A | 6/1993 | Low et al. | |
| 5,651,111 A | 7/1997 | McKeeman et al. | |
| 6,195,765 B1 | 2/2001 | Kislanko et al. | |
| 7,152,157 B2 * | 12/2006 | Murphy et al. | 713/100 |
| 7,412,349 B2 | 8/2008 | Moser et al. | |
| 7,801,771 B1 | 9/2010 | Sirota et al. | |
| 8,046,206 B1 * | 10/2011 | Hood et al. | 703/13 |
| 8,417,658 B2 * | 4/2013 | Arnold et al. | 706/48 |
| 8,549,529 B1 * | 10/2013 | Schildan et al. | 718/104 |
| 8,683,440 B2 | 3/2014 | Pasternak | |
| 2004/0088689 A1 * | 5/2004 | Hammes | 717/154 |
| 2006/0212540 A1 | 9/2006 | Chon et al. | |
| 2008/0222287 A1 | 9/2008 | Bahl et al. | |
| 2008/0281833 A1 | 11/2008 | Cain et al. | |
| 2009/0055684 A1 | 2/2009 | Jamjoom et al. | |
| 2009/0171731 A1 * | 7/2009 | Bobak et al. | 705/8 |
| 2011/0219118 A1 | 9/2011 | Cowan et al. | |
| 2012/0041899 A1 | 2/2012 | Greene et al. | |
| 2012/0142310 A1 | 6/2012 | Pugh et al. | |
| 2012/0317209 A1 | 12/2012 | Briggs | |
| 2014/0026111 A1 * | 1/2014 | Stitt et al. | 717/101 |

OTHER PUBLICATIONS

U.S. Appl. No. 13/587,801, filed Aug. 16, 2012, Titled: Availability Risk Assessment, Resource Audit.
U.S. Appl. No. 13/587,841, filed Aug. 16, 2012, Titled: Availability Risk Assessment, Template Audit.

(Continued)

*Primary Examiner* — Duyen Doan
(74) *Attorney, Agent, or Firm* — Robert C. Kowert; Meyertons, Hood, Kivlin, Kowert & Goetzel, P.C.

(57) ABSTRACT

Embodiments of the present disclosure are directed to, among other things, determining whether some or all portions of an application stack implemented on a distributed system are vulnerable to availability issues. In some examples, a web service may utilize or otherwise control a client instance to control, access, or otherwise manage resources of a distributed system. Based at least in part on comparing one or more customer graphs with one or more model, curated, or best practice graphs of a distributed system, availability risks and/or deployment recommendations may be provided. Additionally, in some examples, one or more remediation and/or migration operations may be performed automatically or provided as recommendations.

25 Claims, 12 Drawing Sheets

(56) References Cited

OTHER PUBLICATIONS

U.S. Appl. No. 13/587,868, filed Aug. 16, 2012, Titled: Availability Risk Assessment, Resource Simulation.

Dean, Jeffrey and Sanjay Ghemawat. "Map Reduce: Simplified Data Processing on /JS/ Large Clusters." [online]. 2004 [retrieved on Dec. 7, 2012]. Retrieved from the Internet: <URL: http://fastandfuriousdecisiontree.googlecode.com/svnhistory/r474/trunk/DIVERS/mapReduceByGoogle.pdf>.

* cited by examiner

AVAILABILITY RISK ASSESSMENT, SYSTEM MODELING

CROSS REFERENCES TO RELATED APPLICATIONS

The present application is related to application Ser. No. 13/587,801, filed on the same day herewith, entitled "COMPUTING RESOURCE AVAILABILITY RISK ASSESSMENT USING GRAPH COMPARISON," application Ser. No. 13/587,841, filed on the same day herewith, entitled "Computing Resource Availability Risk Assessment Using Graph Comparison," and application Ser. No. 13/587,868, filed on the same day herewith, entitled "AVAILABILITY RISK ASSESSMENT, RESOURCE SIMULATION," the entire contents of each is hereby incorporated by reference as if fully set forth herein, under 35 U.S.C. §120.

BACKGROUND

Many data storage services, web services and/or computing devices offer one or more different resource usage and/or allocation configurations. For example, a web service may be distributed, may utilize virtualization, may provide different types of memory storage and/or may provide various configuration options. Additionally, a distributed web service, such as a remote program execution service, may be designed to enable customers to design remotely-hosted applications in a manner that is available even when portions of the hosting infrastructure are unavailable. For example, by deploying resources in more than one physical location or region, the applications may maintain availability even if one physical location or region fails. Other distributed web service products may also provide increased availability to customers and/or consumers. However, many customers remain unaware of the various ways to increase resource availability.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
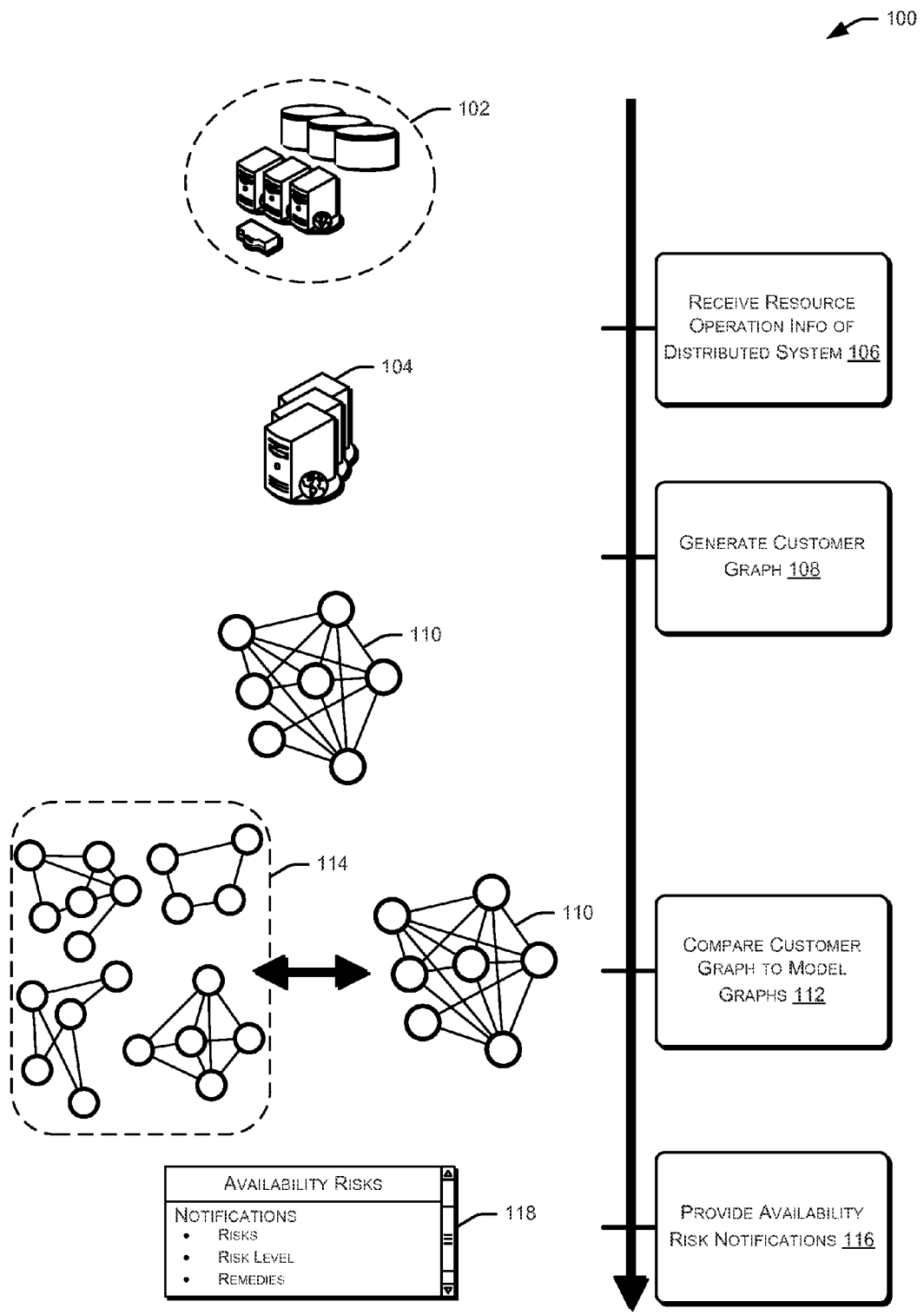
FIG. 1 illustrates an example architecture for implementing availability risk assessment that includes a service provider computer, one or more user devices and/or other computing systems connected via one or more networks, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, assessing, identifying and/or providing resource availability risks regarding electronic resources (e.g., web resources, cloud resources, etc.) via a service provider. In some examples, web service users or customers may utilize or otherwise control a client entity of the service provider to control, access, or otherwise manage electronic resources. As used herein, a client entity may include one or more virtual machine instances configured to access data of a distributed computing system (e.g., provided by the distributed system and acting on behalf of a client or user of the system). In some aspects, the service provider may provide storage, access and/or placement of one or more computing resources through a service such as, but not limited to, a web service, a remote program execution service, or other network based data management service. For example, a user or client entity may access, via the service provider, data storage and/or management such that access mechanisms may be implemented and/or provided to the client entity utilizing the computing resources. In some examples, computing resource services, such as those provided by the service provider, may include one or more computing resources accessible across one or more networks through user interfaces (UIs), application programming interfaces (APIs) and/or other interfaces where the one or more computing resources may be scalable and/or expandable as desired.

In some examples, the computing resources may be server computer systems in a distributed computing environment, although other computing resources are considered as being within the scope of the present disclosure, some examples of which are provided below. Additionally, in some examples, resource availability risks associated with one or more resources (e.g., virtual instances, web applications, etc.) of the distributed systems may be assessed or otherwise determined based at least in part on one or more best practice graphs, user settings, configurations, requests, triggers and/or membership levels. For example, one or more best practice graphs associated with the distributed system may be generated over time based at least in part on historical information, customer comments, requests, or reviews and/or known optimization techniques. As used herein, a best practice graph may be based at least in part one or more configuration or usage guidelines. Further, the graph may be a visual or virtual representation of an application stack, cluster of virtual instances, or the like. For example, a best practice graph may include one or more nodes connected by edges, where the nodes represent electronic resources (such as web links, client instances, physical servers, server farms, etc.) in a cluster or otherwise in communication with one another and the edges represent relative weights assigned to each node pair. In at least one example, the relative weights may be based at least in part on a risk or cost of breaking any link between the two connected nodes.

Additionally, in some aspects, a user or client may access a client entity of a distributed system for attaching data sets, data volumes, data blocks, or the like to the client entity for accessing, manipulating and/or processing the data by the client entity. That is, a client entity may request that particular data volumes be operationally attached to the client entity. In some aspects, operationally attaching data volumes may include generating, storing, maintaining and/or updating a mapping of data stored in the data volume such that the client entity may perform input and/or output (I/O) operations on the data. For example, data may be read from the attached data volume and/or written to the attached data volume by the client entity. According to some examples, data volumes that are attached may be stored in a relatively low latency type of memory such that the I/O operations performed on the data may be performed in a faster (i.e., lower latency) fashion.

Data volumes that are attached to client instances (i.e., client entities or virtual machine instances), in some examples, may be stored in one or more primary memory spaces (e.g., low latency memory) or in one or more backup memory spaces (e.g., high latency memory, durable memory and/or other low latency memory). In some cases, the attached data volumes may be stored in both primary memory spaces and backup memory spaces. In this way, one or more layers of redundancy may help protect from data loss or corruption. Additionally, in some aspects, a user or client entity may request to detach a data volume when, for example, the user or client entity may not plan to access or otherwise perform I/O operations on the data volume for a foreseeable amount of time. For example, a data volume may include resources for operating a seasonal website or other service that operates periodically. Alternatively, or in addition, the data volume may include resources for application development that may be complete or otherwise no longer needed. As such, it may not be desirable to maintain attachment to the client entity at all times. Further, in some examples, a client instance may be taken down, removed, or otherwise deactivated such that it is no longer operational. In this case, attached data volumes may be detached as a matter of course. However, in some examples, although a data volume may be detached for one or more particular reasons, the data volume may continue to be stored in the low latency memory space and/or the backup memory space.

Client instances and/or data volumes may also be organized in clusters and/or in one or more separate geographic areas. Geographic areas may include regions and/or zones. In some examples, zones may be distinct locations that are configured to be insulated from failures in other zones and provide inexpensive, low latency connectivity to other zones in the same region. The distinct locations may be, for example, data centers or other facilities each having a different postal address. A zone may also include multiple such facilities. By launching client instances in separate zones, a customer may be able to protect applications from failure of a single location. In some examples, regions include one or more zones, may be geographically dispersed and may be in separate geographic areas or countries. For example, a group of servers or server farms located in separate cities, states, countries, continents, etc., may operate one or more client instances. That is, in some examples, a customer may request that the service provider spin up, or otherwise provision, multiple client instances; with at least one in the United States and another in Europe. In this way, if a location-specific event occurs that takes down the servers in Europe, subsequent requests for the resource could be routed to the servers in the U.S. Additionally, in this example, a load balancer and/or other controller could manage load and/or bandwidth issues at each instance, such that interruptions to the web service may be minimized.

Additionally, in some aspects, one or more graphs may be generated to represent customer applications, customer application stack deployment and/or client instances within a web service environment, cluster, or other grouping. In some cases, the distributed system, a service provided by the distributed system, or a service provided by a third-party (hereinafter, "service provider") may receive information about client instances associated with an application stack of a customer, infer and/or classify information flow and/or dependencies of the stack and generate a graph based at least in part on the received information, the inferences, the flows and/or the dependencies. For example, the service provider may infer the role and/or relative significance of each client instance in a cluster of instances. The service provider may then assign relative values to the cost of breaking any link between any two nodes within the cluster. Further, the service provider may generate a graph made up of instance nodes joined by edges that represent relative usage of the resource and/or a relative availability risk if a link or node at either end of a given edge becomes unavailable. In some cases, if this information is based at least in part on a customer application, stack, cluster, etc., the generated graph may be a customer graph.

However, the service provider may also generate and/or receive one or more best practice or curated graphs for a distributed system or environment. In some cases, a best practice graph may include graphs known to provide commonly deployed application cluster setups, graphs representing application setups that are known to be safe (at least relative to other setups) and/or graphs representing application setups that are known to yield good results and/or provide high customer satisfaction, low latency, high redundancy, low cost, etc., for a controlling account and/or account holder of the distributed system and/or the service provider. In some cases, best practice graphs (or model graphs) may be generated and collected into a set of best practice graphs for a particular distributed system. Different sets or libraries of best practice graphs may be cultivated, collected, stored, or otherwise managed for each of a plurality of different distributed systems or environments. In some examples, each of the sets may include arbitrary application clusters created by curated graphs based on known characteristics of nodes and edges pulled from the accumulated data (and/or generated graphs) of each distributed system. The service provider may then perform various types of speculative analyses on these model graphs to test arbitrary scenarios and/or provide recommendations for setting up, controlling and/or managing web service applications and/or for migrating the web service applications to other distributed systems. In some aspects, based at least in part on a comparison between a customer graph and one or more model graphs and/or arbitrary graphs of each distributed system, recommendations can be made regarding the customer graph and/or the application stack from which the customer graph was generated.

In some aspects, the service providers may collect data from live operation and/or static attributes of a client instance, application stack, or other electronic resource of a distributed system. The data may be live (i.e., collected based at least in part on monitored operation and/or activities) or it may be static (i.e., collected based at least in part on the application stack as configured to be operated). The data may be utilized to generate customer graphs which may, in some cases, be compared with one or more model graphs associated with the distributed system. Among the model graphs, an ideal graph may be selected or otherwise identified based at least in part on its similarity with the customer graph. Further, based at least in part on the identified ideal graph, availability risks associated with the particular configuration that generated the ideal graph may be assessed. In this instance, a configuration may describe a topology or other type of arrangement (such as a cluster or other grouping). However, in other instances, a configuration may describe a setting or preference. In either case, the particular definition will be apparent based at least in part on the context in which it is used. The assessed availability risks may be reported to a user, customer, account holder, etc., associated with the application stack, client instance and/or web service application. Additionally, in some aspects, the service provider may make recommendations to the customer regarding ways in which the identified availability risks may be avoided or otherwise mitigated. For example, the service provider may recommend that the customer deploy client instances in one or more additional regions or zones.

In some aspects, the service providers may collect application and/or client instance template information from the distributed system or the customer managing the application and/or client instance. Template information may include a template itself (including the representative data) or the data of the template. Template information may also include user provided annotations that indicate relative significance and/or roles of client instances within the application stack. In some instances, a template may be a file or a collection of data that describes a customer's availability instance graphs (e.g., a customer graph). That is, the template may be a document that describes how a cloud application cluster is to be configured, deployed, or otherwise setup. It may include a detailed declaration of intent that can be consumed by the service provider or other computer program to construct the desired application cluster. As such, the service providers may be able to construct a customer graph based at least in part on the received template or template information. The service providers may also be able to infer roles and/or a relative significance for each node and/or edge of the customer graph based at least in part on the template information. For example, the role and/or relative significance may be determined based at least in part on the user-provided annotations (when provided). In some cases, once the customer graph is generated, the service providers may be able to compare it with one or more of the model graphs described above to identify an ideal graph. Availability risks may be assessed and/or recommendations may then be provided based at least in part on the identified ideal graph.

In some aspects, the service providers may collect application and/or client instance information based at least in part on simulating the application stack for any given customer. Additionally, the simulation may be based at least in part on one or more templates and/or one or more previously generated customer graphs. In some examples, a service provider may instantiate an application cluster (including, but not limited to, being based at least in part on the template information) within a controlled runtime environment. Further, the service provider may introduce disruptions into the environment and, in some examples, have the customer (or a computer process or agent) indicate when the applications experience degradations. Based at least in part on correlating the identified degradations and service outage information with the disruptive signals introduced, the service provider may be able to propose an augmented ideal graph that may guard against such actual disruptions. In this way, availability risk assessment may be performed and/or recommendations for custom configurations may be provided.

The service provider may also be configured to determine resource allocation advice, in some examples, based at least in part on the identified ideal graphs and/or the availability risk determinations. A remediation plan may also be determined. For example, if it is determined that client instances should be deployed in three different zones or regions, the remediation plan may include a recommendation and/or an instruction to instantiate client instances in those zones or regions. In some aspects, the service provider may be configured to perform the remediation plan automatically. Additionally, automatic remediation may be configured by the user such that only certain remediation operations are performed automatically. In this case, remediation plans that are not performed automatically may still be indicated to the customer (as in an alert, text message, email, pop-up window, etc.). That is, the service provider may transmit or otherwise notify the user of the remediation plan and/or an instruction for performing the remediation plan without automatically performing the remediation. Remediation plans may also include one-click remediation to fix determined issues, third-party remediation options and/or information regarding how to consult a remediation advisor for additional help. Additionally, in some aspects, the availability risk assessment and/or remediation actions (and/or recommendations) may be performed or otherwise provided by third-party services. Further, in some aspects, user or customers may be charged a commission based at least in part on the savings or performance increase generated from the availability risk assessments and/or the remediation actions.

More specifically, a service provider computer, such as a server operated by a financial institution, an online merchant, a news publication company, a web services company, a social networking company, or the like, may maintain and/or backup data volumes for one or more client entities of a distributed computing system. The service provider computer may also receive requests to backup data volumes associated with the client entities, to attach and/or detach data volumes to the client entities and/or to utilize other resources and/or services of the service provider. Additionally, in some examples, the service provider may receive, determine and/or otherwise collect statistical information associated with the resource (e.g., client entities, data volumes) and/or services in order to perform the availability risk assessments and/or generate the customer graphs.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architectures

FIG. 1 depicts an illustrative flow 200 in which techniques for availability risk assessment may be implemented. In illustrative flow 200, one or more computing resources of a distributed system 102 may operate together, in some cases operatively attached to one another via one or more networks. For example, the distributed system 102 may include a switch, router, or network interface device, one or more computing devices or servers and/or data storage devices. Other devices may also be part of the distributed system 102. Further, in some cases, one or more service provider computers 104 such as, but not limited to, servers, server farms, etc. may be configured to implement the described techniques for availability risk assessment. For example, at 106 of the flow 200, the service provider computers 104 may receive resource operation information of the distributed system 102. At 108 of the flow 200, the service provider computers 104 generate a customer graph 110 to represent the received operation information. In some examples, at 112 of the flow 200, the service provider computers 104 may compare the customer graph 110 against one or more (or a set) of model, curated, or best practice graphs 114. Based at least in part on the results of the comparison, the flow 200 may end at 116 by providing an availability risk notification via a user interface 118 or other notification techniques including, but not limited to, text messages, emails, telephone calls, etc.

Figure 2:
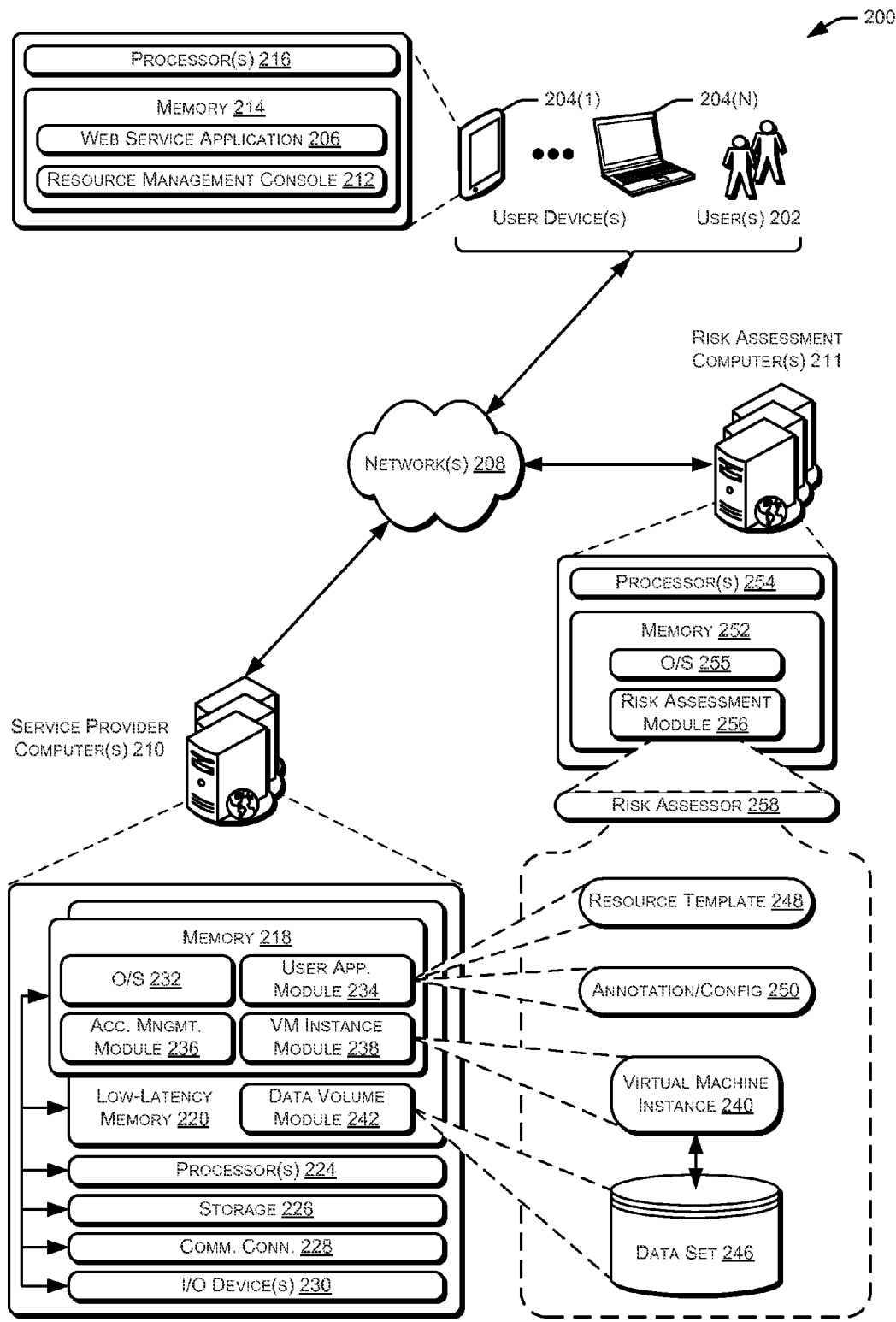
FIGS. 2-4 illustrate example block diagrams for describing at least some features of the availability risk assessment described herein, according to at least one example.

FIG. 2 depicts an illustrative system or architecture 200 in which techniques for availability risk assessment may be implemented. In architecture 200, one or more users 202 (i.e., account holders) may utilize user computing devices 204(1)-(N) (collectively, user devices 204) to access a web service application 206, or a user account accessible through the web service application 206, via one or more networks 208. In some aspects, the web service application 206 and/or user account may be hosted, managed and/or provided by a computing resources service or service provider, such as by utilizing one or more service provider computers 210 and/or one or more risk assessment computers 211. The one or more service provider computers 210 may, in some examples, provide computing resources such as, but not limited to, client entities, low latency data storage, durable data storage, data access, management, virtualization, etc. In some aspects, a client entity may be deployed and/or managed virtually and/or data volumes may be stored virtually within a distributed computing system operated by the one or more service provider computers 210. The one or more service provider computers 210 may also be operable to provide web hosting, computer application development and/or implementation platforms, combinations of the foregoing, or the like to the one or more users 202. The one or more risk assessment computers 211, in some examples, may provide availability risk assessment and/or system modeling as a third-party service to the service provider computers 210. However, in some examples, the risk assessment computers 211 may be fully integrated with the service provider computers 210 such that they are controlled, managed, or otherwise operated by the same entity.

In some examples, the networks 208 may include any one or a combination of many different types of networks, such as cable networks, the Internet, wireless networks, cellular networks and other private and/or public networks. While the illustrated example represents the users 202 accessing the web service application 206 over the networks 208, the described techniques may equally apply in instances where the users 202 interact with a service provider computer 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the web service application 206 may allow the users 202 to interact with a service provider computer 210, such as to store, access and/or manage data, develop and/or deploy computer applications and/or host web content. The one or more service provider computers 210, perhaps arranged in a cluster of servers or as a server farm, may host the web service application 206. Other server architectures may also be used to host the web service application 206. The web service application 206 may be capable of handling requests from many users 202 and serving, in response, various user interfaces that can be rendered at the user devices 204 such as, but not limited to the resource management console 212. The web service application 206 can be any type of website that supports user interaction, including social networking sites, online retailers, informational sites, blog sites, search engine sites, news and entertainment sites and so forth. As discussed above, the described techniques can similarly be implemented outside of the web service application 206, such as with other applications running on the user devices 204.

As noted above, the architecture 200 may include one or more user devices 204. The user devices 204 may be any type of computing device such as, but not limited to, a mobile phone, a smart phone, a personal digital assistant (PDA), a laptop computer, a desktop computer, a thin-client device, a tablet PC, etc. In some examples, the user devices 204 may be in communication with the service provider computers 210 and/or the risk assessment computers 211 via the networks 208, or via other network connections. While, the following description may regularly refer to interaction between the user devices 204 and the service provider computers 210, it is to be understood that any communication to or from the user devices 204 may be via either (or both) of the service provider computers 210 or the risk assessment computers 211.

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein including at least the resource management console 212, such as web browsers or dedicated applications (e.g., smart phone applications, tablet applications, etc.) and/or the web service application 206. The resource management console 212 may be configured to receive, store and/or display a website or other interface for interacting with the service provider computers 210 and/or the risk assessment computers 211. Additionally, the memory 214 may store access credentials and/or other user information such as, but not limited to, user IDs, passwords and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

Additionally, in some aspects, the resource management console 212 may allow a user 202 to interact with a web services account of the service provider computers 210. For example, the user 202 may request that computing resources be allocated to instantiate a client instance (or entity) on behalf of the user 202. Further, the client instance may then be physically or virtually attached to one or more data stores via interaction between the user 202 and the resource management console 212. Also utilizing the resource management console 212, in some examples, a user 202 may request that snapshots (e.g., backup copies—described in further detail below) of attached data sets be stored in additional memory spaces. For example, a snapshot request may involve backing up one or more portions of data volumes or entire data volumes on behalf of the user 202. In some aspects, however, a snapshot may involve only storing a backup of data that has changed within a data set since the last snapshot, backup, or creation of the data set. For example, if a first snapshot is taken that generates a backup of an entire data volume, a second snapshot (requested after only a few bytes of the volume have changed) may only back-up the particular few bytes of the volume that have changed. The resource management console 212 may also be configured to receive, organize, store and/or manage account settings and/or preferences. For example, configuration settings associated with how many instances to utilize, what network ports to open, whether to purchase reserved instances, locations, regions and/or zones in which instances and/or data should be hosted and/or stored, user-preferred security settings, load balancer settings, etc., may be received from, stored on behalf of and/or managed on behalf of the user and/or account via the resource management console 212.

Further, in some aspects, the resource management console 212 may be configured to receive requests from the users 202 to assess availability risks and/or simulate configuration settings of the resources provided by the service provider computer 210. For example, utilizing the resource management console 212, a user 202 may configure a web services account of the service provider computers 210 to instantiate a virtual client instance to run a website and/or attach data volumes for consumption by the virtual client instance. The user 202 may then, in some examples, utilize the resource management console 212 to request that the availability risks of the client instance and/or attached data volumes (i.e., the application cluster and/or stack) be assessed or modeled. The users 202 may also utilize the resource management console 212 to request recommendations for limiting availability risks of the virtual resources. As used herein, availability risk assessment may include, but is not limited to, determining whether some or all of a user's 202 application stack is vulnerable to single-availability zone failures. That is, relative availability risks may define relative values or costs associated with a client instance becoming unavailable, due at least in part to a server failure or other event within a particular regions, zone, location, etc.

Further, in some examples, the resource management console 212 may display or otherwise provide resource recommendations provided by the service provider computers 210 for lessening or otherwise mitigating identified availability risks. The resource management console 212 may also act as a migration interface, when the service provider computers 210 are used as a migration advisor. That is, in some examples, the service provider computers 210 may provide migration recommendations and/or services associated with migrating services from one or more web services to one or more other web services, such as, but not limited to, migrating services from a first distributed computing system to a second distributed computing system, or vice versa.

In some aspects, the service provider computers 210 may also be any type of computing devices such as, but not limited to, mobile, desktop, thin-client and/or cloud computing devices, such as servers. In some examples, the service provider computers 210 may be in communication with the user devices 204 and/or the risk assessment computers 211 via the networks 208, or via other network connections. The service provider computers 210 may include one or more servers, perhaps arranged in a cluster, as a server farm, or as individual servers not associated with one another. These servers may be configured to host a website (or combination of websites) viewable via the user devices 204 or a web browser accessible by a user 202. Additionally, in some aspects, the service provider computers 210 may be configured to perform resource risk assessment as part of an integrated, distributed computing environment.

In one illustrative configuration, the service provider computers 210 may include at least one memory 218, at least one low-latency memory 220 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of service provider computers 210, the memory 218 may be volatile (such as random access memory (RAM)) and/or non-volatile (such as read-only memory (ROM), flash memory, etc.). The service provider computers 210 or servers may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as static random access memory (SRAM), dynamic random access memory (DRAM), or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media.

The service provider computers 210 may also contain communications connection(s) 228 that allow the service provider computers 210 to communicate with a stored database, another computing device or server, user terminals and/or other devices on the networks 208. The service provider computers 210 may also include input/output (I/O) device(s) 230, such as a keyboard, a mouse, a pen, a voice input device, a touch input device, a display, speakers, a printer, etc.

Turning to the contents of the memory 218 in more detail, the memory 218 may include an operating system 232 and one or more application programs or services for implementing the features disclosed herein including a user application module 234, an account management module 236 and/or a virtual machine instance module 238. The user application module 234 may be configured to generate, host, or otherwise provide the resource management console 212 and/or a website for accessing the resource management console 212 (e.g., the web service application 206), to users 202.

In some examples, the account management module 236 may be configured to maintain, or otherwise store, account information associated with requested resources, data and/or services. The account information may include account holder information, the user ID, the password, acceptable answers to challenge questions, etc. In some aspects, the virtual machine instance module 238 may be configured to operate as a hypervisor or other virtualization system. For example, the virtual machine instance module 238 may create, generate, instantiate, or otherwise provide one or more virtual machine instances 240 (i.e., a client entity of the distributed system) to a user 202 by providing one or more guest operating systems that may operate on behalf of the user 202. That is, in some examples, a user 202 may operate a virtual machine instance 240 as if the operations were being performed by one or more processors 216 of a user device 204. As such, the virtual machine instance 240 may be considered a client entity acting on behalf of user 202 and/or accessing data, data sets, data volumes, data blocks, etc., of the one or more service provider computers 210.

Additionally, in some examples, the one or more service provider computers 210 may include a low-latency memory 220. The low-latency memory 220 may include one or more application programs or services for implementing the features disclosed herein including a data volume module 242. In some examples, as shown in FIG. 1, the data volume module 242 may be configured to implement, host, or otherwise manage data stored in a data set 246. As noted above, in some aspects, a user 202 may make requests for attaching and/or detaching data sets 246 from one or more virtual machine instances 240 (i.e., client entities) and/or for backing up (e.g., taking a snapshot of) data of the attached data volumes. For example, a user 202 may be an application programmer testing code using a virtual machine instance 240 and an attached data set 246 of the service provider computers 210. In this non-limiting example, while the code is being tested, the user 202 may have the data set 246 attached to the virtual machine instance 240 and may request that one or more I/O operations be performed on the attached data set 246. During and/or after testing of the code, the user 202 may make one or more backup (e.g., snapshot) requests of the attached data set 246. However, in some examples, once the testing is complete, the user 202 may request that the attached data set 246 be detached from the virtual machine instance 240.

Further, other operations and/or configurations utilizing the virtual machine instance 240 and/or the data set 246 may be envisioned, as desired, for implementing a web service on behalf of a user 202. For example, a user 202 may be a website owner using a virtual machine instance 240 and an attached data set 246 of the service provider computers 210 to host the website. In this non-limiting example, the data set 246 may be attached to the virtual machine instance 240 while the website is operational. Additionally, in some examples, multiple virtual machine instances 240 may be instantiated to host the website and each virtual machine instance 240 may be attached to the data set 246 or a plurality of data sets 246. Additionally, as discussed above, each virtual machine instance may be hosted by servers or server farms located in different physical regions, zones, locations, etc.

Returning to the contents of the memory 218 in more detail, the user application module 234 may also store resource templates 248, annotations and/or configurations 250. As described above, in some instances, a resource template 248 may be a file or a collection of data that describes a user's 202 virtual machine instance 240 deployments. That is, the resource template 248 may be a document that describes how a cloud application cluster is to be configured, deployed, or otherwise setup. It may include a detailed declaration of intent that can be consumed by the service provider computers 210 or other computer program to construct the desired application cluster (i.e., the specific setup of interaction between the virtual machine instance 240 and another virtual machine instance 240 and/or a data set 246. In some cases, the service provider computers 210 may receive the resource templates 248 via the web service application 206 and/or resource management console 212 of the user devices 204. Further, in some examples, the resource templates 248 and/or other data files may include template annotations and/or resource configuration information 250. Template annotations 250 may be user-provided hints or indications of resource role and/or significance within the application cluster. For example, a user 202 may indicate that a particular virtual machine instance 240 is a parent node, a child node, a backup node, etc. Further, configuration information 250 may include other application stack information including, but not limited, load balancer settings, availability zone settings, operational timing settings, etc.

Additional types of computer storage media that may be present in the service provider computers 210 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 210. Combinations of any of the above should also be included within the scope of computer-readable media.

Additionally, in some aspects, the risk assessment computers 211 may also be any type of computing devices such as, but not limited to, mobile, desktop, thin-client and/or cloud computing devices, such as servers. In some examples, the risk assessment computers 211 may be in communication with the user devices 204 and/or the service provider computers 210 via the networks 208, or via other network connections. The risk assessment computers 211 may include one or more servers, perhaps arranged in a cluster, as a server farm, or as individual servers not associated with one another. These servers may be configured to perform resource risk assessment as part of an integrated, distributed computing environment.

In one illustrative configuration, the risk assessment computers 211 may include at least one memory 252 and one or more processing units (or processor(s)) 254. The processor(s) 254 may be implemented as appropriate in hardware, computer-executable instructions, firmware, or combinations thereof. Computer-executable instruction or firmware implementations of the processor(s) 254 may include computer-executable or machine-executable instructions written in any suitable programming language to perform the various functions described.

The memory 252 may store program instructions that are loadable and executable on the processor(s) 254, as well as data generated during the execution of these programs. Depending on the configuration and type of risk assessment computers 211, the memory 252 may be volatile (such as random access memory (RAM)) and/or non-volatile (such as read-only memory (ROM), flash memory, etc.). The risk assessment computers 211 or servers may also include additional storage, which may include removable storage and/or non-removable storage. The additional storage may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 252 may include multiple different types of memory, such as static random access memory (SRAM), dynamic random access memory (DRAM), or ROM.

The memory 252 and the additional storage, both removable and non-removable, are all examples of computer-readable storage media. Additional types of computer storage media that may be present in the service provider computers 210 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The risk assessment computers 211 may also contain communications connection(s) that allow the risk assessment computers 211 to communicate with a stored database, another computing device or server, user terminals and/or other devices on the networks 208. The risk assessment computers 211 may also include input/output (I/O) device(s), such as a keyboard, a mouse, a pen, a voice input device, a touch input device, a display, speakers, a printer, etc.

Turning to the contents of the memory 252 in more detail, the memory 252 may include an operating system 155 and one or more application programs or services for implementing the features disclosed herein including a risk assessment module 256. The risk assessment module 256 may be configured to determine resource availability risks for customer application stacks and/or generate component models for one or more distributed computing systems.

In some examples, the risk assessment module 236 may be configured to receive resource information (e.g., information associated with one or more client instances) of a distributed system, generate customer graphs associated with the received information, generate and/or receive model graphs (i.e., best practice graphs) for the distributed system and/or one or more other distributed systems and determine resource availability risks. In some cases, determining the resource availability risks may include, but is not limited to, comparing customer graphs with model graphs to identify an ideal graph. The ideal graph may then provide information for assessing the availability risks, recommending risk mitigation and/or recommending migration to a different distributed system. A graph may be a graph in the mathematical sense (e.g., directed graph, a symmetric graph, or other similar data structure). Thus, the graph may comprise a plurality of nodes connected by edges or links. The nodes may represent electronic resources (such as web links, client instances, physical servers, server farms, etc.) in a cluster or otherwise in communication with one another. The edges may represent relative weights assigned to each node pair that may be based at least in part on the associated risk or cost of breaking each link between the two connected nodes. An edge may connect two nodes when the corresponding nodes have some sort of relationship (e.g., depend on one another, link to or from one another, are reachable via one another, etc.). The graph may be encoded and/or stored electronically in any suitable manner.

In at least one non-limiting example, the risk assessment module 256 may implement a risk assessor 258 for monitoring resources of the service provider computers 210 and/or collecting information associated with the monitored resources. For example, the risk assessor 258 may be configured to receive operational information (e.g., live data associated with operation of resources) associated with a virtual machine instance 240 and/or a data set 246. That is, while a virtual machine instance 240 is operating (e.g., as a web server to a user 202), the risk assessor 258 may collect dependency and/or flow information associated with the virtual machine instance 240. The risk assessor 258 may also be able to monitor and/or receive information associated with resource templates 248, data sets 246 and/or annotations/configurations 250. A few examples of the operations of the risk assessment computers 211 and/or the service provider computers 210 are described in greater detail below with reference to FIGS. 7-11.

Figure 3:
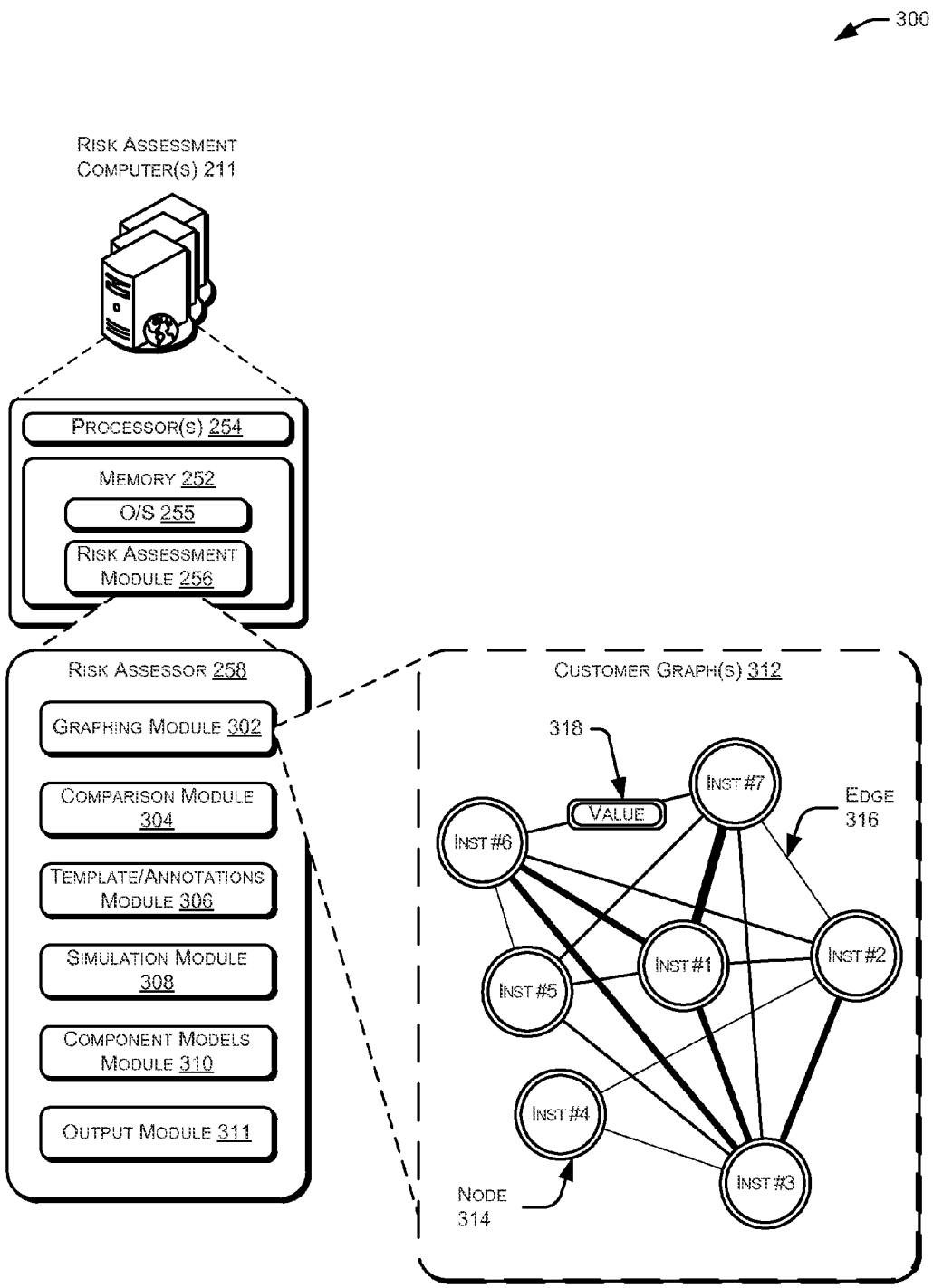

FIG. 3 depicts an illustrative system or architecture 300 in which additional features and/or techniques of the risk assessment computers 211 of FIG. 2 are illustrated. In architecture 300, the risk assessor 258 can be seen configured with a graphing module 302, a comparison module 304, a template/annotations module 306, a simulation module 308, a component models module 310 and/or an output module 211. As described above with respect to FIG. 2, in some aspects the risk assessor 258 may be configured to receive operational information associated with the dependencies and/or flows of client instances of a distributed system. Additionally, based at least in part on the received information, the graphing module 202 may be configured to infer a role and/or a relative significance of each client instance, and further generate one or more graphs 312 (e.g., a customer graph associated with a user 202 of the service provider computers 210) for a customer's application stack.

Additionally, in some aspects, the graphing module 302 (or the risk assessor 258 in general) may be configured to infer the role and relative significance of each client instance in a cluster of instances based at least in part on measuring and/or recording various properties of the instances (either during an operation or based at least in part on configuration information). For example, the risk assessor 258 may be able to infer the role of an instance based at least in part on the composition of the machine image from which the client instance was instantiated (e.g., was the image from a Microsoft® Windows Database Server, a Citrix® NetScaler Appliance, a Ubuntu® LAMP stack image, etc.). The risk assessor 258 may also be able to infer the role of an instance based at least in part on firewall rules, security groups, routing rules and/or a number and/or configuration of network interfaces attached to the instance. The role may also be inferred based at least in part on the instances use of available resources over time. For example, an instance with a large amount of memory, that typically writes little to disk, sporadically reads from disk, doesn't initiate many new connections, but receives a large amount of incoming network connection requests may be a memory cache of some sort. As such, a memory cache role may be inferred for this instance.

Additionally, the risk assessor 258 may be able to infer the role and/or relative significance of an instance within a cluster based at least in part on network flow patterns. For example, in master-slave, server-client modeled application stacks, the master server instance may be more likely to have more distinct connections coming to it from other instances in the cluster than the slave servers. As such, a master or slave role and/or significance may be inferred for this instance. The role and/or relative significance of an instance may also be inferred for an instance based at least in part on taking a census of various protocols of packets flowing into the instance and to and/or from where such packs come. Having inferred the roles, relative significances and/or interdependencies of instances within a cluster, the graphing module 302 may then be configured to assign relative values to the cost of breaking any link between any two nodes within the cluster (i.e., between any two instances in a cluster). For example, links that experience more traffic than others may cost more than links that experience less traffic. Additionally, links that experience the same kind of traffic may be redundant and, thus, may cost less per link if unavailable.

In some examples, the graphing module 302 may also be configured to generate a customer graph to represent the client instances of the cluster, configuration, arrangement, grouping, etc. That is, each node 314 may represent a single instance of the cluster (i.e., based at least in part on an application stack) while the edges 316 (which connect nodes 314) may represent a relative usage value 318 (which may translate to relative availability risk if a link or node 314 at either end of a given edge 316 becomes unavailable). Additionally, in some aspects, the relative values assigned to each edge are shown, for example only, by the thickness of the lines. For example, in FIG. 3, the edge between instance #1 and instance #7 may be illustrated as the thickest and, thus, may represent the highest valued edge in this illustration. In some examples, the graph 312 generated from a particular application stack may be considered a customer graph. Further, while the graph 312 of FIG. 3 depicts a graph with seven nodes (representing seven instances: instance #1-instance #7) and sixteen edges, any number of nodes and/or edges may be envisioned. Additionally, each instance may include one or more attributes 320, 322. Attributes may be based at least in part on annotations of a template or other configuration information. Attributes may also be based at least in part on metadata associated with each instance. Attributes may include, but are not limited to, correlated failures (e.g., the likelihood of one instance failure will affect other instances), regions, datacenters, racks within a datacenter, buildings within a datacenter, power sources within a building, etc., associated with each instance. In some aspects, each instance may be associated with different attributes 320, 322 or different sets of attributes; however, some instances may share attributes with other instances. For example, the attributes 320 may indicate particular correlated failures, regions, datacenters, racks and/or power sources associated with instance #6, while the attributes 322 may only indicate a region and/or a datacenter associated with instance #7. By way of example only, the attributes 320, 322 may indicate that instance #6 and instance #7 may be located within the same region and/or at the same datacenter. However, in other examples, they may be located at different data centers of the same region, or the like.

In some aspects, the risk assessor 258 may also include a template/annotations module 306. The template/annotations module 306 may be configured to provide a user interface, via at least the resource management console 212 of the user device 204, for a user 202 to submit one or more resource templates. As noted above, a resource template may include, but is not limited to, configuration information for setting up an application cluster or one or more client instances. As such, a user 202 may fill in or otherwise generate and provide a resource template for a particular application cluster. In some examples, the template/annotations module 306 may be further configured to receive the template information, infer roles and relative significances of client instances and pass this information to the graphing module 302. In this way, the graphing module 302 may generate a customer graph 312 based at least in part on the template information. Additionally, the template/annotations module 306 may also provide an interface for a user 202 to enter instance annotations. In some examples, these instance annotations may be utilized by the template/annotations module 306 and/or the graphing module 302 to supplement the customer graphs 312. In at least one example, the customer graph may be generated based at least in part on the annotations. However, in other examples, the customer graph 312 may be generated without the use of the annotations, and then the customer graph 312 may be altered (e.g., the weights of the edges may be changed) based at least in part on the annotations.

Additionally, in some aspects, the risk assessor 258 may also include a simulation module 308. The simulation module 308 may be configured to simulate one or more client instances. Simulation may be performed in a controlled environment, in some examples, such that disruptions (e.g., unavailable servers, excessive server requests, etc.) may be introduced into the environment. In some cases, the disruptions may be selected by an administrator of the distributed system, by the user 202, automatically by the distributed system, based at least in part on a configuration setting, combinations of the foregoing, or the like. Additionally, once disruptions have been introduced into the simulation of the one or more client instances or instance clusters, the users 202 (or a computer process or agent) may indicate whether the simulated application cluster experienced degraded performance. Based at least in part on this indication, the simulation module 308 may be configured to correlate user 202 identified degradation and service outage to the disruptive signals introduced in the contained runtime environment. In some cases, the simulation module 308 may utilize the correlation information to propose augmented ideal graphs to the user 202. Such augmented ideal graphs may help guard against disruption when actual events mimic the disruptive signals (e.g., outside of the simulation). The augmented ideal graphs may, in some cases, be machine generated and/or curated by users 202 or administrators. Further, in some cases, the simulation module 208 may generate, control, or otherwise manage the simulations based at least in part on template information 248, template annotations 250 and/or instance configuration information 250.

In some cases, the risk assessor 258 may also include an output module 311. The output module 311 may be configured to provide output to the service provider computers 210 and/or the user devices 204. In this way, the output module 311 may provide risk assessment information, ideal graphs, recommendations, migration information, etc., to the users 202 and/or to the distributed system/environment provided by the service provider computers 210. For example, once the risk assessor 258 identifies an ideal availability graph for a particular customer graph, the output module 311 may report known vulnerability links of the graph to the user device 204 and/or the service provider computers 210. Additionally, in some examples, the output module 311 may be configured to provide recommendations on how to mitigate or otherwise avoid availability issues. In some examples, the recommendations may be based at least in part on services specific to the service provider computers 210 and/or a web service operated by the service provider computers 210 (e.g., elastic load balancers, auto scaling groups, block storage, etc.).

Additionally, the output module 311 may also be configured to provide recommendations in a tiered fashion in the event that there are multiple ideal graphs identified by the risk assessor 258. For example, recommendations may be provided based at least in part on several factors including, but not limited to, the most available/resilient ideal graph, the cheapest and/or most available ideal graph, the most available ideal graph with the lowest known or identified latencies, etc. In this example, the user 202 may set tiered configurations or settings such that only certain factors may be preferred or otherwise tiered based at least in part on importance to the user 202.

Further, in some aspects, the risk assessor 258 may be configured to automatically (or based at least in part on a setting or configuration of the user 202) introduce remediative components (e.g., additional client instances, client instances in additional and/or different zones, regions, or locations, combinations of the foregoing, or the like) into the cluster on behalf of the user 202 to rectify an availability risk issue. The risk assessor 258 may introduce the components, in some cases, only upon approval and/or authorization by the user 202. Additionally, in some examples, the risk assessor 258 may be configured to provide (in some cases via the output module 311) appropriate alerts to the users 202 when changes in the distributed system (e.g., physical, configuration, location, etc., changes to the environment) increase the availability risk levels of the resources. The risk assessor 258 may provide such alerts on an ongoing basis. Further, in some cases, the alerts may be based at least in part on what is known of the risk profile of identified ideal graphs, which, in some cases, may be dynamic and based at least in part on the distributed system and/or the application stack.

Figure 4:
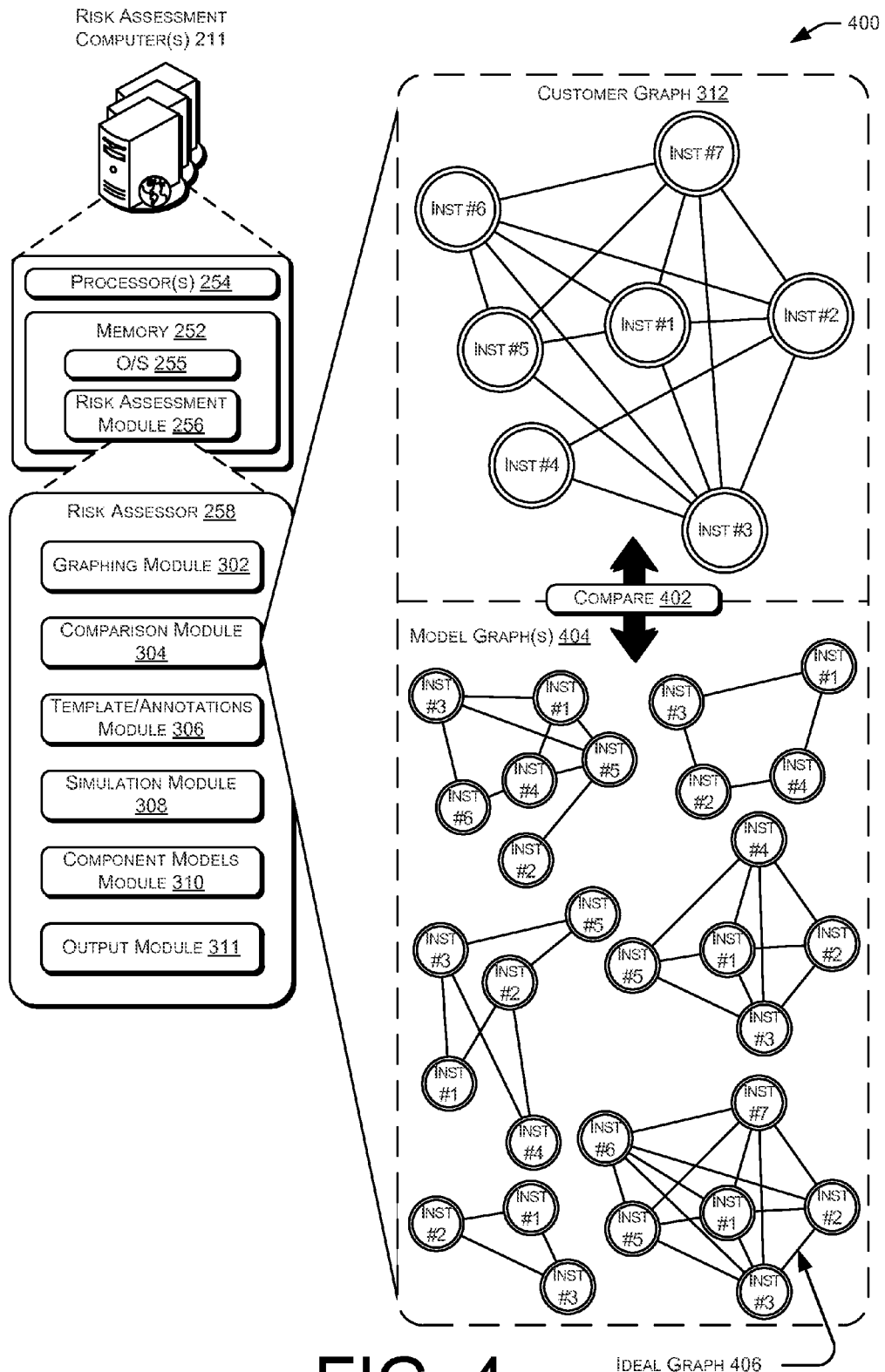

FIG. 4 depicts an illustrative system or architecture 400 in which additional features and/or techniques of the risk assessment computers 211 of FIG. 2 are illustrated. For example, the risk assessor 258 may be configured with a comparison module 304 configured to compare 402 customer graphs 312 with a set (or library) of model graphs 404. In some aspects, the set of model graphs 404 (or curated graphs) may be graphs known to provide commonly deployed application cluster setups within the distributed computing system. The comparison module 304 may be configured to identify one or more ideal graphs from the set of model graphs 404. In some cases, an ideal graph may be one graph of the set of model graphs 404 that is functionally equivalent to the customer graph 312, but may have superior characteristics.

In some examples, identifying an ideal graph from the set of model graphs 404 may include, but is not limited to, comparing the graphs to identify a graph within the set of model graphs 404 that has an ideal graph and is most similar to the customer graph (i.e., identifying an ideal graph C for some intermediate graph B that is isomorphic with the customer graph A 312 or its derivative A'). Additionally, comparing the graphs to identify an ideal graph may involve human matching of the customer graph A 312 or its intermediate graph B to ideal graph C and then setting up the mapping for future automated assignment. In one non-limiting example, the comparison module 304 may identify ideal graph 406 as the best match for the customer graph 312. Further, having identified the ideal availability graph 406 for the customer graph 312, the risk assessor module 256 may report known vulnerable links to the users 202 via the web service application 206 and/or the resource management console 212 of FIG. 2.

As such, graph comparison may include determining if two graphs are most similar using the above mentioned isomorphic identification techniques and/or intermediate graph identification techniques. Additionally, in some aspects, other comparison techniques may be performed by the comparison module 304 such as, but not limited to, node similarity matrix analysis, subgraph matching, local edge similarity techniques, node labeling, other isomorphism comparison techniques, bijection identification, minimum cost transformation techniques, minim cost traversal techniques, minimum and/or maximum common subgraph analysis, node and/or edge similarity score techniques, combinations of the foregoing, or the like.

Figure 5:
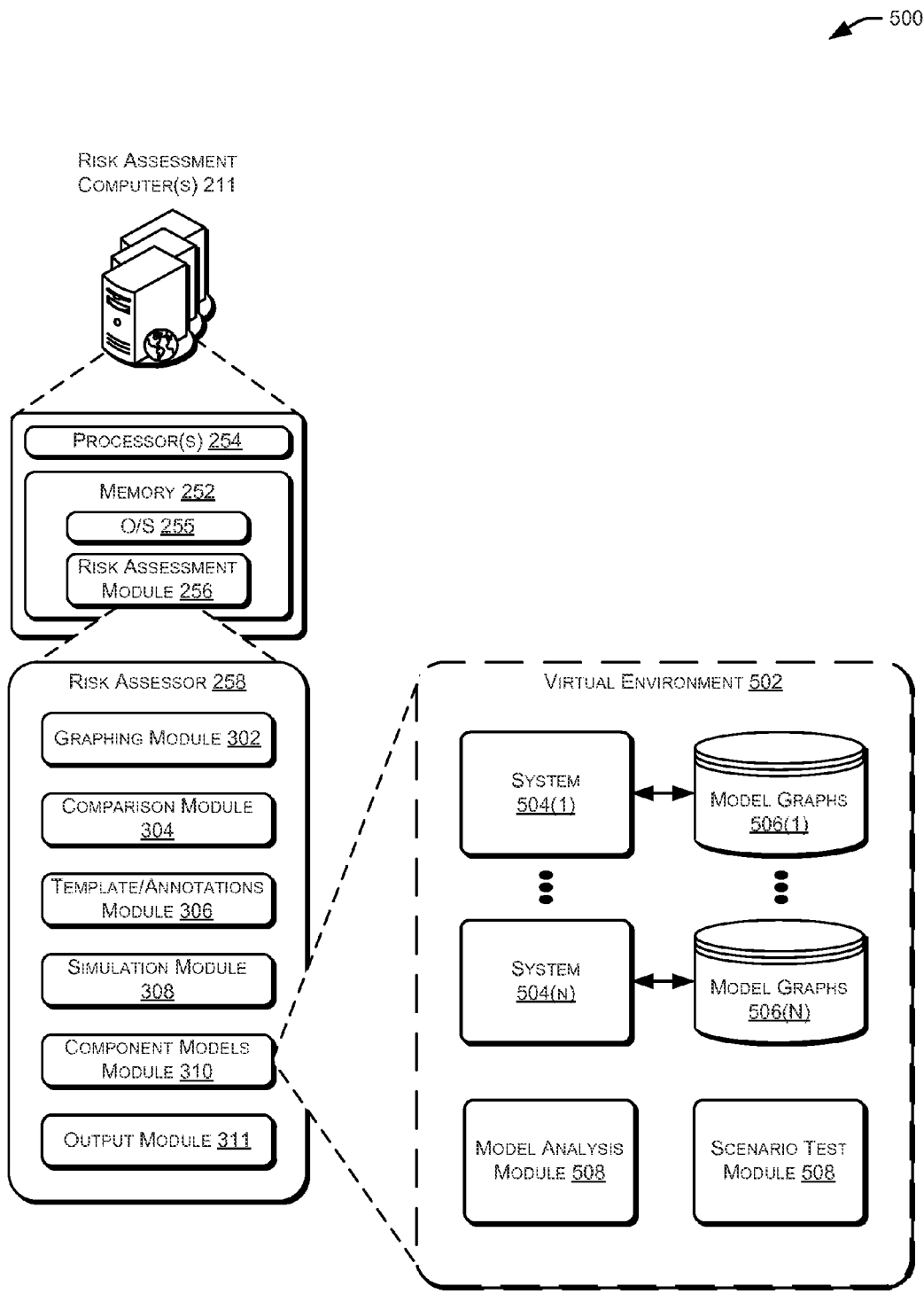
FIG. 5 illustrates an example architecture of a distributed program execution service that may be utilized to implement the availability risk assessment described herein, according to at least one example.

FIG. 5 depicts an illustrative system or architecture 500 in which additional features and/or techniques of the risk assessment computers 211 of FIG. 2 are illustrated. For example, the risk assessor 258 may be configured with a component models module 310. In some aspects, the component models module 311 may be configured to model one or more distributed computing systems to generate a virtual environment 502 for testing arbitrary scenarios for users 202. That is, the component models module 310 may generate or otherwise provide the virtual environment 502 of FIG. 5 which may include, but is not limited to, one or more distributed systems 504(1), . . . , 504(N) (collectively, "systems 504") with associated of model graphs sets (or libraries) 506(1), . . . , 506(N) (collectively, "model graph sets 506"). The virtual environment 502 may also include a model analysis module 508 and a scenario test module 408.

In some examples, the model analysis module 508 may be configured to collect data from one or more distributed systems 506 including, but not limited to, the distributed system hosted by the service provider computers 210 and/or other third-party distributed computing system providers (e.g., cloud service providers, etc.). The data collected, as described above with respect to the graphing module 302 of FIG. 3, may represent nodes, edges and/or graphs that model common application stacks. Additionally, the model analysis module 508 may be configured to compose arbitrary application clusters by creating model graphs based at least in part on known characteristics of nodes and edges from the collected data. As such, the model analysis module 508 may include the created model graphs within the appropriate model graph sets 506. For example, if data is collected from the system 504(1), the model analysis module 508 may generate a model graph, based at least in part on the characteristics of the system 504(1), and include that model graph in the model graph set 506(1). Over time, the virtual environment 502 may grow to include rather large model graphs 506 representing many different systems 504.

Additionally, the model analysis module 508 may be configured to perform various types of speculative analysis on the model graph sets 506. In some cases, the model analysis module 508 may analyze one or more of the model graph sets 506 individually (i.e., sets for individual systems 504). However, in other cases, the model analysis module 508 may analyze multiple model graph sets 506 together, analyzing model graphs from multiple different model graph sets 506 as part of the same analysis. Analysis of the model graphs may include, but is not limited to, exercising the model graphs through representative mathematical models, neural networks, etc. Additionally, the analysis may include instantiating physical representations of the model graphs within a controlled environment such as, but not limited to, the virtual environment 502, and observing the actual availability risk profiles when subjected to disruptions.

Further, in some examples, the scenario test module 508 may be configured to provide an application programming interface (API) and/or a user interface to the users 202 (e.g., via communication between the output module 211 and the resource management console 212 of FIG. 2) that facilitates constructing customer and/or test model graphs that enable the user 202 to test arbitrary scenarios either computationally or empirically. The tests performed by the scenario test module 508, on behalf of the user 202 and/or an administrator of the service provider computers 210 or other systems, may allow the component models module 210 the ability to generate and provide recommendations regarding how to deploy an application cluster of the user 202. That is, with data collected from multiple systems 504, the users 202 can utilize the virtual environment 502 of the component models module 310 to model application cluster availability as well as other attributes and characteristics of cloud-hosted servers. As such, comparisons may be made between deploying an application stack between multiple systems 504. Similarly, the component models module 310 may be able to provide recommendations for an appropriate system 504 from which the users 202 should deploy their applications. Further, in some examples, the component models module 310 may provide migration recommendations associated with migrating a user's 202 application from a first system 504 to a second system 504. The risk assessor 258 may utilize the output module 311, in some examples, to transmit the results of the scenario test module 508 and/or the migration recommendation.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

Figure 6:
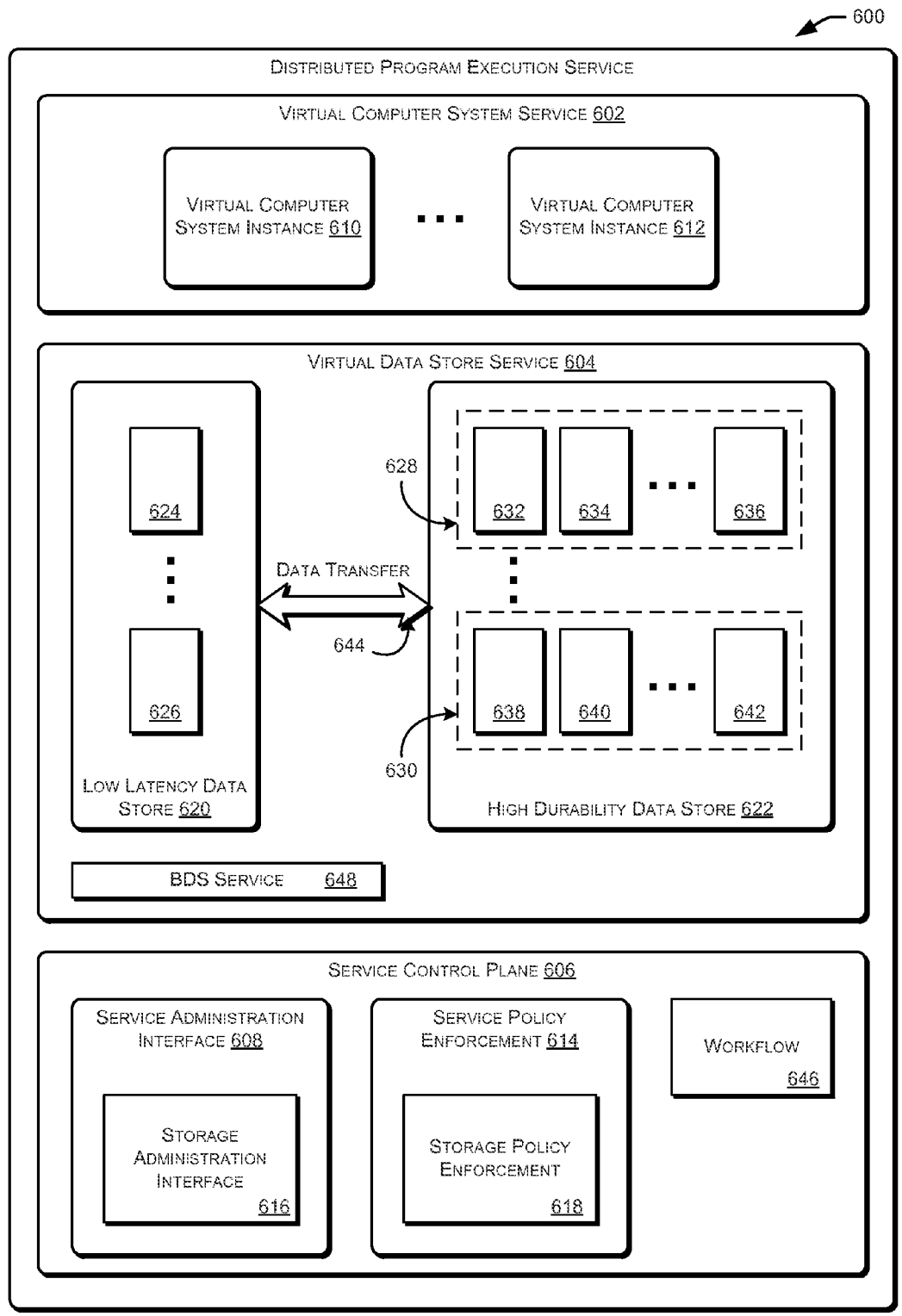
FIGS. 6-11 illustrate example flow diagrams of processes for implementing at least some features of the availability risk assessment described herein, according to at least a few examples.

As noted, in at least one example, one or more aspects of the environment or architectures 200-600 of FIGS. 2-6 may incorporate and/or be incorporated into a distributed program execution service such as that hosted by the service provider computers 110. FIG. 6 depicts aspects of an example distributed program execution service 600 in accordance with at least one example. The distributed program execution service 600 may provide virtualized computing services, including a virtual computer system service 602 and a virtual data store service 604, with a wide variety of computing resources interlinked by a relatively high speed data network. Such computing resources may include processors such as central processing units (CPUs), volatile storage devices such as RAM, nonvolatile storage devices such as flash memory, hard drives and optical drives, servers such as the service provider computers 110 described above with reference to FIG. 1, one or more data stores such as the data set 146 of FIG. 1, as well as communication bandwidth in the interlinking network. The computing resources managed by the distributed program execution service 600 are not shown explicitly in FIG. 6 because it is an aspect of the distributed program execution service 600 to emphasize an independence of the virtualized computing services from the computing resources that implement them.

The distributed program execution service 600 may utilize the computing resources to implement the virtualized computing services at least in part by executing one or more programs, program modules, program components and/or programmatic objects (collectively, "program components") including and/or compiled from instructions and/or code specified with any suitable machine and/or programming language. For example, the computing resources may be allocated, and reallocated as necessary, to facilitate execution of the program components, and/or the program components may be assigned, and reassigned as necessary, to the computing resources. Such assignment may include physical relocation of program components, for example, to enhance execution efficiency. From a perspective of a user of the virtualized computing services, the distributed program execution service 600 may supply computing resources elastically and/or on-demand, for example, associated with a per resource unit commodity-style pricing plan.

The distributed program execution service 600 may further utilize the computing resources to implement a service control plane 606 configured at least to control the virtualized computing services. The service control plane 606 may include a service administration interface 608. The service administration interface 608 may include a web-based user interface configured at least to enable users and/or administrators of the virtualized computing services to provision, de-provision, configure and/or reconfigure (collectively, "provision") suitable aspects of the virtualized computing services. For example, a user of the virtual computer system service 602 may provision one or more virtual computer system instances 610, 612. The user may then configure the provisioned virtual computer system instances 610, 612 to execute the user's application programs. The ellipsis between the virtual computer system instances 610 and 612 (as well as with other ellipses throughout this disclosure) indicates that the virtual computer system service 602 may support any suitable number (e.g., thousands, millions and more) of virtual computer system instances although, for clarity, only two are shown.

The service administration interface 608 may further enable users and/or administrators to specify and/or re-specify virtualized computing service policies. Such policies may be maintained and enforced by a service policy enforcement component 614 of the service control plane 606. For example, a storage administration interface 616 portion of the service administration interface 608 may be utilized by users and/or administrators of the virtual data store service 604 to specify virtual data store service policies to be maintained and enforced by a storage policy enforcement component 618 of the service policy enforcement component 614. Various aspects and/or facilities of the virtual computer system service 602 and the virtual data store service 604 including the virtual computer system instances 610, 612, the low latency data store 620, the high durability data store 622 and/or the underlying computing resources may be controlled with interfaces such as application programming interfaces (APIs) and/or web-based service interfaces. In at least one example, the control plane 606 further includes a workflow component 646 configured at least to interact with and/or guide interaction with the interfaces of the various aspects and/or facilities of the virtual computer system service 602 and the virtual data store service 604 in accordance with one or more workflows.

In at least one embodiment, service administration interface 608 and/or the service policy enforcement component 614 may create, and/or cause the workflow component 646 to create, one or more workflows that are then maintained by the workflow component 646. Workflows, such as provisioning workflows and policy enforcement workflows, may include one or more sequences of tasks to be executed to perform a job, such as provisioning or policy enforcement. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the service administration interface 608. As another example, a policy enforcement workflow may be created from a policy enforcement workflow template configured with parameters by the service policy enforcement component 614.

The workflow component 646 may modify, further specify and/or further configure established workflows. For example, the workflow component 646 may select particular computing resources of the distributed program execution service 600 to execute and/or be assigned to particular tasks. Such selection may be based at least in part on the computing resource needs of the particular task as assessed by the workflow component 646. As another example, the workflow component 646 may add additional and/or duplicate tasks to an established workflow and/or reconfigure information flow between tasks in the established workflow. Such modification of established workflows may be based at least in part on an execution efficiency analysis by the workflow component 646. For example, some tasks may be efficiently performed in parallel, while other tasks depend on the successful completion of previous tasks.

The virtual data store service 604 may include multiple types of virtual data stores such as a low latency data store 620 and a high durability data store 622. For example, the low latency data store 620 may maintain one or more data sets 624, 626 which may be read and/or written (collectively, "accessed") by the virtual computer system instances 610, 612 with relatively low latency. The ellipsis between the data sets 624 and 626 indicates that the low latency data store 620 may support any suitable number (e.g., thousands, millions and more) of data sets although, for clarity, only two are shown. For each data set 624, 626 maintained by the low latency data store 620, the high durability data store 622 may maintain a set of captures 628, 630. Each set of captures 628, 630 may maintain any suitable number of captures 632, 634, 636 and 638, 640, 642 of its associated data set 624, 626, respectively, as indicated by the ellipses. Each capture 632, 634, 636 and 638, 640, 642 may provide a representation of the respective data set 624 and 626 at particular moment in time. Such captures 632, 634, 636 and 638, 640, 642 may be utilized for later inspection including restoration of the respective data set 624 and 626 to its state at the captured moment in time. Although each component of the distributed program execution service 600 may communicate utilizing the underlying network, data transfer 644 between the low latency data store 620 and the high durability data store 622 is highlighted in FIG. 6 because the contribution to utilization load on the underlying network by such data transfer 644 can be significant.

For example, the data sets 624, 626 of the low latency data store 620 may be virtual disk files (i.e., file(s) that can contain sequences of bytes that represent disk partitions and file systems) or other logical volumes. The low latency data store 620 may include a low overhead virtualization layer providing access to underlying data storage hardware. For example, the virtualization layer of the low latency data store 620 may be low overhead relative to an equivalent layer of the high durability data store 622. Systems and methods for establishing and maintaining low latency data stores and high durability data stores in accordance with at least one embodiment are known to those of skill in the art, so only some of their features are highlighted herein. In at least one embodiment, the sets of underlying computing resources allocated to the low latency data store 620 and the high durability data store 622, respectively, are substantially disjointed. In a specific embodiment, the low latency data store 620 could be a Storage Area Network (SAN) target or the like. In this exemplary embodiment, the physical computer system that hosts the virtual computer system instance 610, 612 can send read/write requests to the SAN target.

The low latency data store 620 and/or the high durability data store 622 may be considered non-local and/or independent with respect to the virtual computer system instances 610, 612. For example, physical servers implementing the virtual computer system service 602 may include local storage facilities such as hard drives. Such local storage facilities may be relatively low latency but limited in other ways, for example, with respect to reliability, durability, size, throughput and/or availability. Furthermore, data in local storage allocated to particular virtual computer system instances 610, 612 may have a validity lifetime corresponding to the virtual computer system instance 610, 612, so that if the virtual computer system instance 610, 612 fails or is de-provisioned, the local data is lost and/or becomes invalid. In at least one embodiment, data sets 624, 626 in non-local storage may be efficiently shared by multiple virtual computer system instances 610, 612. For example, the data sets 624, 626 may be mounted by the virtual computer system instances 610, 612 as virtual storage volumes.

Data stores in the virtual data store service 604, including the low latency data store 620 and/or the high durability data store 622, may be facilitated by and/or implemented with a block data storage (BDS) service 648, at least in part. The BDS service 648 may facilitate the creation, reading, updating and/or deletion of one or more block data storage volumes, such as virtual storage volumes, with a set of allocated computing resources including multiple block data storage servers. A block data storage volume, and/or the data blocks thereof, may be distributed and/or replicated across multiple block data storage servers to enhance volume reliability, latency, durability and/or availability. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a block data volume stored on a server block data storage system in a data center may execute on one or more other physical computing systems at that data center.

The BDS service 648 may facilitate and/or implement local caching of data blocks as they are transferred through the underlying computing resources of the distributed program execution service 600 including local caching at data store servers implementing the low latency data store 620 and/or the high durability data store 622, and local caching at virtual computer system servers implementing the virtual computer system service 602. In at least one embodiment, the high durability data store 622 is an archive quality data store implemented independent of the BDS service 648. The high durability data store 622 may work with sets of data that are large relative to the data blocks manipulated by the BDS service 648. The high durability data store 622 may be implemented independent of the BDS service 648. For example, with distinct interfaces, protocols, and/or storage formats.

Each data set 624, 626 may have a distinct pattern of change over time. For example, the data set 624 may have a higher rate of change than the data set 626. However, in at least one embodiment, bulk average rates of change insufficiently characterize data set change. For example, the rate of change of the data set 624, 626 may itself have a pattern that varies with respect to time of day, day of week, seasonally including expected bursts correlated with holidays and/or special events and/or annually. Different portions of the data set 624, 626 may be associated with different rates of change, and each rate of change "signal" may itself be composed of independent signal sources, for example, detectable with Fourier analysis techniques. Any suitable statistical analysis techniques may be utilized to model data set change patterns including Markov modeling and Bayesian modeling.

As described above, an initial capture 632 of the data set 624 may involve a substantially full copy of the data set 624 and transfer 644 through the network to the high durability data store 622 (may be a "full capture"). In a specific example, this may include taking a snapshot of the blocks that make up a virtual storage volume. Data transferred between the low latency data store 620 and high durability data store 622 may be orchestrated by one or more processes of the BDS service 648. As another example, a virtual disk (storage volume) may be transferred to a physical computer hosting a virtual computer system instance 610. A hypervisor may generate a write log that describes the data and location where the virtual computer system instance 610 writes the data. The write log may then be stored by the high durability data store 622 along with an image of the virtual disk when it was sent to the physical computer.

The data set 624 may be associated with various kinds of metadata. Some, none, or all of such metadata may be included in a capture 632, 634, 636 of the data set 624 depending on the type of the data set 624. For example, the low latency data store 620 may specify metadata to be included in a capture depending on its cost of reconstruction in a failure recovery scenario. Captures 634, 636 beyond the initial capture 632 may be "incremental," for example, involving a copy of changes to the data set 624 since one or more previous captures. Changes to a data set may also be recorded by a group of differencing virtual disks which each comprise a set of data blocks. Each differencing virtual disk may be a parent and/or child differencing disk. A child differencing disk may contain data blocks that are changed relative to a parent differencing disk. Captures 632, 634, 636 may be arranged in a hierarchy of classes, so that a particular capture may be incremental with respect to a sub-hierarchy of capture classes (e.g., a capture scheduled weekly may be redundant with respect to daily captures of the past week, but incremental with respect to the previous weekly capture). Depending on the frequency of subsequent captures 634, 636, utilization load on the underlying computing resources can be significantly less for incremental captures compared to full captures.

For example, a capture 632, 634, 636 of the data set 624 may include read access of a set of servers and/or storage devices implementing the low latency data store 620, as well as write access to update metadata, for example, to update a data structure tracking "dirty" data blocks of the data set 624. For the purposes of this description, data blocks of the data set 624 are dirty (with respect to a particular class and/or type of capture) if they have been changed since the most recent capture (of the same class and/or type). Prior to being transferred 644 from the low latency data store 620 to the high durability data store 622, capture 632, 634, 636 data may be compressed and/or encrypted by the set of servers. At the high durability data store 622, received capture 632, 634, 636 data may again be written to an underlying set of servers and/or storage devices. Thus each capture 632, 634, 636 involves a load on finite underlying computing resources including server load and network load. It should be noted that, while illustrative embodiments of the present disclosure discuss storage of captures in the high durability data store 622, captures may be stored in numerous ways. Captures may be stored in any data store capable of storing captures including, but not limited to, low-latency data stores and the same data stores that store the data being captured.

Captures 632, 634, 636 of the data set 624 may be manually requested, for example, utilizing the storage administration interface 616. In at least one embodiment, the captures 632, 634, 636 may be automatically scheduled in accordance with a data set capture policy. Data set capture policies in accordance with at least one embodiment may be specified with the storage administration interface 616, as well as associated with one or more particular data sets 624, 626. The data set capture policy may specify a fixed or flexible schedule for data set capture. Fixed data set capture schedules may specify captures at particular times of day, days of the week, months of the year and/or any suitable time and date. Fixed data set capture schedules may include recurring captures (e.g., every weekday at midnight, every Friday at 2 am, 4 am every first of the month) as well as one-off captures.

Illustrative Processes

FIGS. 7-11 illustrate example flow diagrams showing respective processes 700-1100 for providing availability risk assessment and/or distributed system component modeling. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Figure 7:
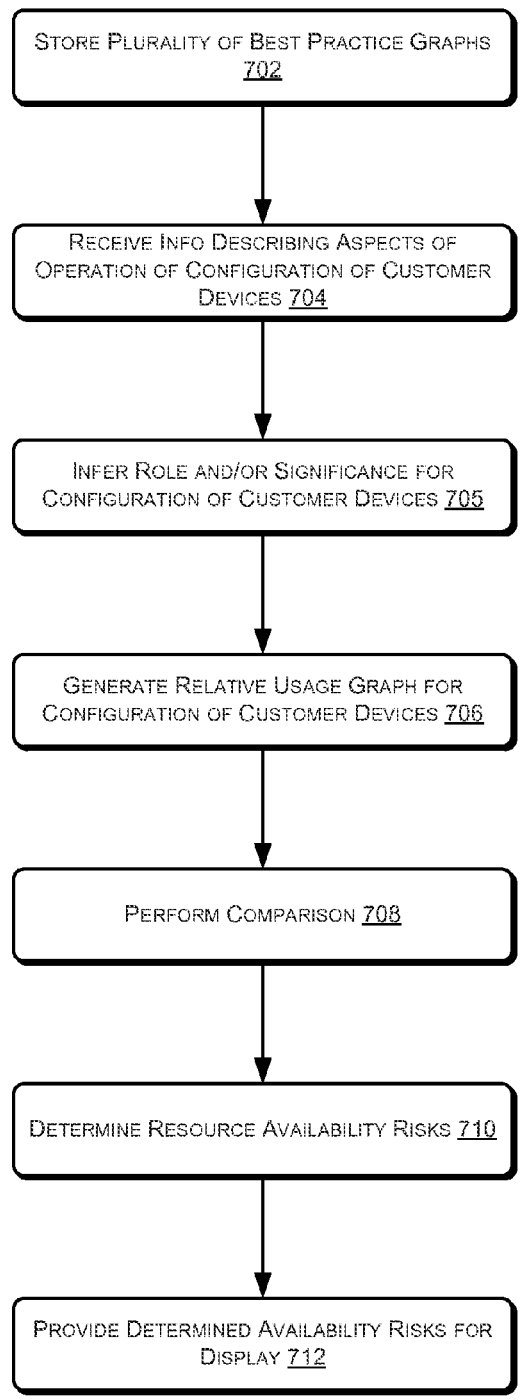

In some aspects, the one or more risk assessment computers 211 and/or the one or more service provider computers 210 shown in FIG. 2 may perform the process 700 of FIG. 7. The process 700 may begin by including storage of a plurality of best practice groups at 702. In some aspects, the best practice groups may be associated with the operation of one or more computer systems. As noted, the graphs may include, but are not limited to, mathematical representations, directed graphs, undirected graphs, models and/or other data structures. At 704, the process 700 may include receiving information describing one or more aspects of operation of a configuration of customer devices. The configuration of customer devices may be a set of devices configured to work together, such as in a distributed system or other implementation. Customer devices may include physical devices, virtual machines, and/or reliance on services that may be offered (e.g., in the same area). For example, a storage service may offer functionality for storing data across multiple regions of a distributed network or the like. As such, a customer device may include storage devices of the storage service, client instances of a cloud computing service or other types of devices of other services. In some cases, the one or more aspects may include inter-dependencies, roles, relative significance, data storage aspects, etc. The process 700 may also include inferring a role and/or significance for the configuration of customer devices, at 705. Further, at 706, the process 700 may include generating a relative usage graph for the configuration of customer devices. The relative usage graph may be considered a customer graph and may also be represented with any type of data structure. The relative usage graph may also be generated based at least in part on the information received at 704.

In some aspects, the process 700 may include performing a comparison of the relative usage graph with at least a subset of the best practice graphs to select an ideal best practice graph, at 708. The ideal best practice graph may be selected from the subset of best practice graphs. Any known graph comparison technique may be utilized as described above at least with reference to FIG. 4. Based at least in part on the selected ideal best practice graph, the process 700 may include determining resource availability risks at 710. As noted above, resource availability risks may include known vulnerable links of a cluster of web resources and/or the risk of a link or node of the distributed system becoming unavailable. The process 700 may end at 712, where the process 700 may include providing the determined availability risks (e.g., for display). In some examples, the availability risks may be provided for display to a user associated with the configuration of customer devices.

Figure 8:
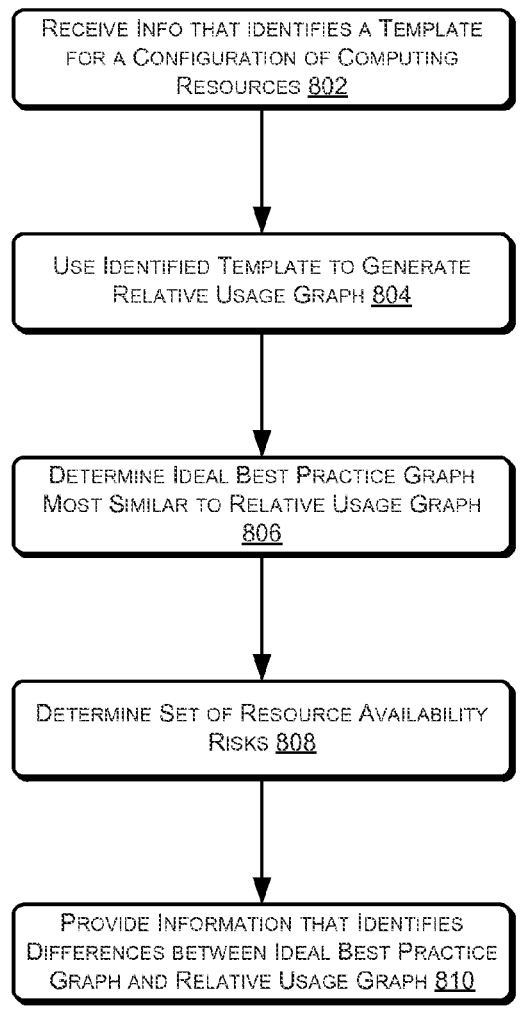

FIG. 8 illustrates an example flow diagram showing process 800 for providing availability risk assessment. In some aspects, the one or more risk assessment computers 211 and/or the one or more service provider computers 210 shown in FIG. 2 may perform the process 800 of FIG. 8. The process 800 may begin by including reception of information that identifies a template for a configuration of computing resources, at 802. The template may be a user-specified or user-provided file (e.g., an extensible hypertext markup language (XML) file) that defines or otherwise identifies configuration information for deploying a distributed system or a cluster of distributed computing resources. At 804, the process 800 may include utilizing the identified template to generate a relative usage graph. In some aspects, the entire template may be utilized to generate the graph, while in other examples, some subset of the information from the template may be utilized. The process 800 may then include determining an ideal best practice graph that is most similar to the relative usage graph, at 806. In some examples, the ideal best practice graph may be selected from a set of stored best practice graphs and/or based at least in part on one or more weighted edges. At 808, the process 800 may include determining a set of resource availability risks. The process 800 may end at 810, where the process 800 may include providing information that identifies differences between the ideal best practice graph and the relative usage graph.

Figure 9:
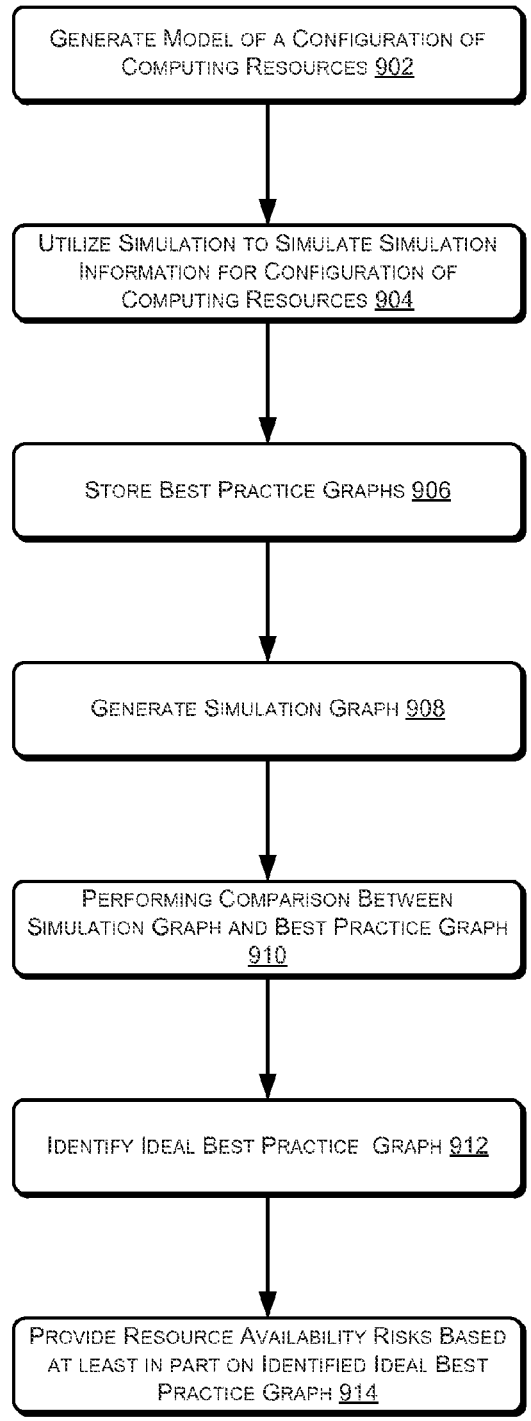

FIG. 9 illustrates an example flow diagram showing process 900 for providing availability risk assessment. In some aspects, the one or more risk assessment computers 211 and/or the one or more service provider computers 210 shown in FIG. 2 may perform the process 900 of FIG. 9. The process 900 may begin at 902 by including generation of a model of a configuration of computing resources. In some examples, computing resources may include, but are not limited to, servers, server farms, processors, memory or other data storage devices, instances, etc. At 904, the process 900 may include utilizing a simulation to simulate simulation information for a configuration of computing resources. That, the process 900 may include simulating the simulation information that defines or otherwise represents the configuration. At 906, the process 900 may include storing one or more best practice graphs. In some examples, the best practice graphs may be curated or otherwise created by engineers or administrators of the distributed computing system. The process 900, at 908, may include generating a simulation graph that represents the simulation cluster, application stack, or distributed computing resources. At 910, the process 900 may include performing a comparison between the simulation graph and the best practice graphs. Based at least in part on the comparison, the process 900 may include identifying an ideal best practice graph, at 912. The process 900 may then terminate at 914 where the process 900 may include providing resource availability risks based at least in part on the identified ideal best practice graph.

Figure 10:
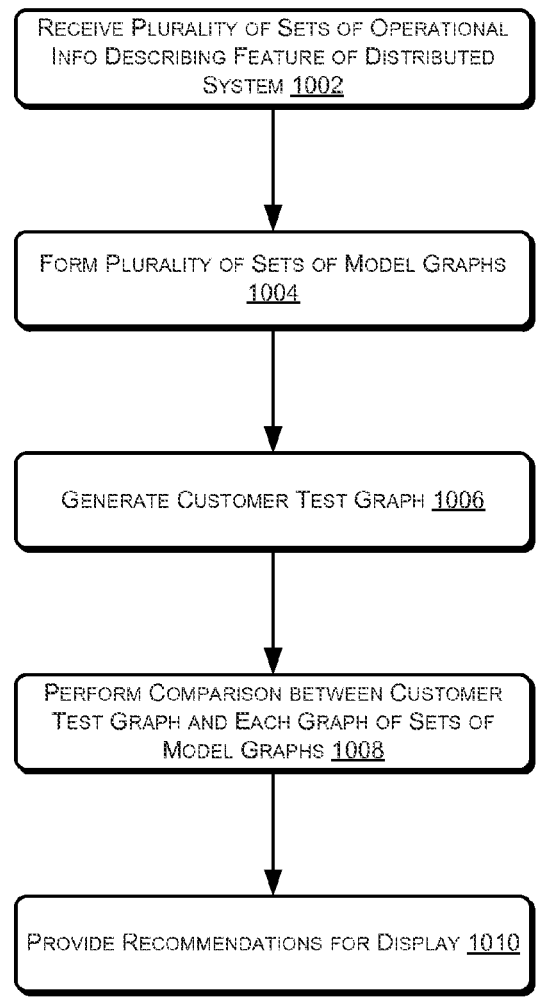

FIG. 10 illustrates an example flow diagram showing process 1000 for providing availability risk assessment. In some aspects, the one or more risk assessment computers 211 and/or the one or more service provider computers 210 shown in FIG. 2 may perform the process 1000 of FIG. 10. The process 1000 may begin at 1002 by including reception of a plurality of sets of operational information describing features of a distributed system. In some aspects, each set of the plurality of sets comes from a different distributed system. Further, in some examples, each different distributed system may be owned or otherwise managed by different entities. At 1004, the process 1000 may include forming a plurality of set of model graphs. Each model graph may be based at least in part on best practice information associated with each respective distributed system. The process 1000, at 1006, may include generating one or more customer test graphs. A customer test graph may represent one or more customer configurations or it may be an arbitrary graph generated or designed by the customer to test the distributed system. At 1008, the process 1000 may include testing the customer test graph in each distributed system by, in at least one example, performing a comparison between the customer test graph and each graph of the sets of model graphs. The process 1000 may end at 1010 where the process 1000 may include providing recommendations. In some examples, the recommendations may be based at least in part on the comparison of 1008

Figure 11:
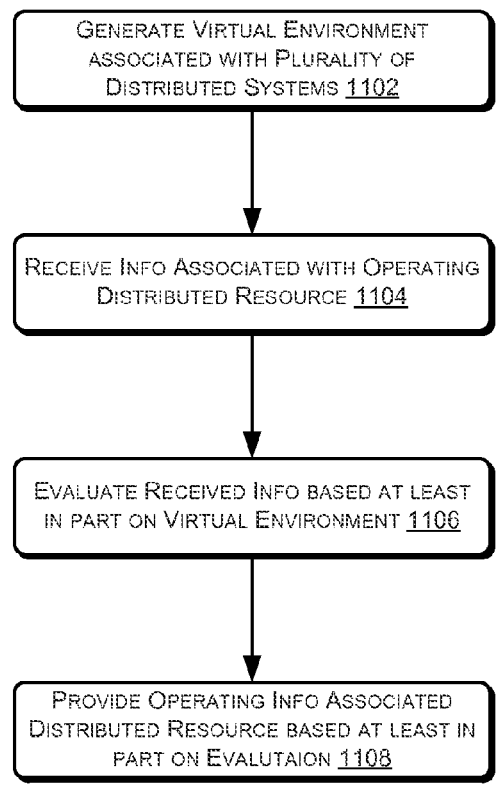

FIG. 11 illustrates an example flow diagram showing process 1100 for providing availability risk assessment. In some aspects, the one or more risk assessment computers 211 and/or the one or more service provider computers 210 shown in FIG. 2 may perform the process 1100 of FIG. 11. The process 1100 may begin at 1102 by including generation of a virtual environment associated with a plurality of service provider environments. For example, the virtual environment may model how each of multiple different distributed environments (e.g., of different service providers) would operate given a particular resource instance and/or service provider environment configuration. As such, different configurations may be tested for each different service provider environment within the virtual environment. In some examples, a service provider environment may include a distributed environment of a single vendor or third-party service. Additionally, in some examples, one vendor entity may include multiple service provider entities, such that multiple different web services may be provided by a single vendor and included within the meaning of a single service provider environment. At 1104, the process 1100 may include receiving information associated with operating a distributed resource. The distributed resource may include, but is not limited to, one or more resource instances, data storage devices, virtual machine instances, etc. At 1106, the process 1100 may include evaluating the received information based at least in part on the virtual environment and/or on a particular model of the virtual environment. The process 1100 may also include providing operating information associated with the distributed resource based at least in part on the evaluation at 1108. At 1110, the process 1100 may include receiving user-defined performance metrics. The user-defined performance metrics may indicate performance levels expected by the defining user. The process 1100 may end at 1112 where the process 1100 may include indicating when the metric is met (or a condition associated with the metric is met) at a cost below a particular level. In some cases, the user may define the particular level of cost as well.

Illustrative methods and systems for providing availability risk assessment and/or distributed system component modeling are described above. Some or all of these systems and methods may, but need not, be implemented at least partially by architectures such as those shown at least in FIGS. 2-7 above.

Illustrative Environments

Figure 12:
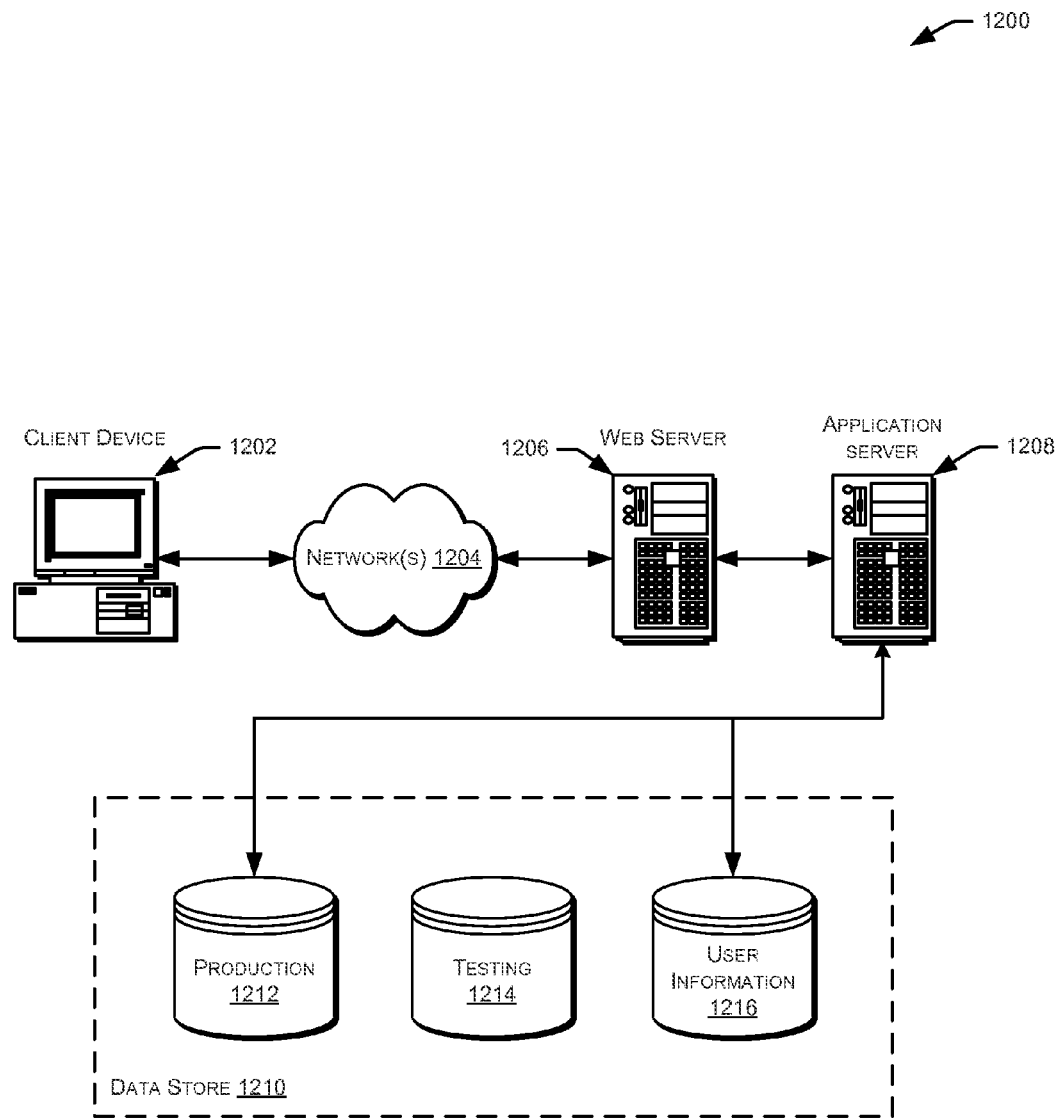
FIG. 12 illustrates an example block diagram of at least one environment in which various embodiments of features described herein can be implemented, according to at least one example.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed, or clustered environment. The application server can include any appropriate hardware and computer-executable instructions for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the web server in the form of HTML, XML, or another appropriate structured language in this example. The handling of all requests and responses, as well as the delivery of content between the client device 1202 and the application server 1208, can be handled by the web server. It should be understood that the web and application servers are not required and are merely example components, as structured code discussed herein can be executed on any appropriate device or host machine as discussed elsewhere herein.

The data store 1210 can include several separate data tables, databases, or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser.

Each server typically may include an operating system that provides executable program instructions for the general administration and operation of that server, and typically may include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless and handheld devices running mobile applications and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a SAN familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one CPU, at least one input device (e.g., a mouse, keyboard, controller, touch screen, or keypad) and at least one output device (e.g., a display device, printer, or speaker). Such a system may also include one or more storage devices, such as disk drives, optical storage devices and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically may include a number of computer-executable applications, modules, services, or other elements located within at least one working memory device, including an operating system and application programs, such as a client application or web browser. Modules may include, but are not limited to, executable code, computer program products, program applications, or portions and/or combinations thereof. For example a module may be a program construct, class, object and/or other portion of code, written in a programming language and stored in memory for execution by one or more processors of one of or more computing devices for facilitating, effectuating, or otherwise controlling operation of the computing device. It should be appreciated that alternate embodiments may have numerous variations from that described above. For example, customized hardware might also be used and/or particular elements might be implemented in hardware, computer instructions (including portable applications, such as applets), or both. Further, connection to other computing devices such as network input/output devices may be employed.

Storage media and computer readable media for containing code, or portions of code, can include any appropriate media known or used in the art, including storage media and communication media such as, but not limited to, volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

Further, the example architectures, tools and computing devices shown in FIGS. 1-6 are provided by way of example only. Numerous other operating environments, system architectures and device configurations are possible. Accordingly, embodiments of the present disclosure should not be construed as being limited to any particular operating environment, system architecture, or device configuration.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for distributed resource management, comprising:

under control of one or more computer systems configured with executable instructions, receiving a plurality of sets of operational information describing at least one feature of a distributed computing system, each set of operational information from a different distributed computing system;

forming, based at least in part on the received plurality of sets of information, a plurality of sets of model graphs, each set of model graphs associated with each respective different distributed computing system;

generating, based at least in part on information that describes a configuration of computing devices, a customer test graph;

performing a comparison of the customer test graph with at least a subset of each of the sets of model graphs to select an ideal curated graph from at least one of the sets of model graphs that is most similar to the customer graph; and providing to a user associated with the configuration of computing devices, one or more recommendations based at least in part on the selected ideal curated graph.

2. The computer-implemented method of claim 1, wherein the each of a subset of the plurality of sets of operational information is based at least in part on an application stack.

3. The computer-implemented method of claim 1, further comprising forming, based at least in part on at least a subset of the model graphs of a particular set of model graphs, at least one arbitrary graph for the particular set of model graphs.

4. The computer-implemented method of claim 3, further comprising analyzing at least one of the at least one arbitrary graphs or a model graph of the particular set of model graphs by instantiating a virtual representation of the model graph or the at least one arbitrary graphs within a controlled environment.

5. The computer-implemented method of claim 4, wherein instantiating the virtual representation of the model graph or the at least one arbitrary graphs within the controlled environment includes injecting virtual disruptions into the controlled environment.

6. The computer-implemented method of claim 5, wherein the recommendations provided are further based at least in part on an outcome of at least one of the instantiation or the injection of virtual disruptions.

7. A computer-implemented method for resource availability management, comprising:

under control of one or more computer systems configured with executable instructions, storing a plurality of sets of best practice graphs, each of the sets of best practice graphs from a respective different distributed computing system;

receiving, from a user of the distributed computing system, information describing a configuration of resources of the distributed system;

comparing a user graph with at least a portion of best practice graphs in at least one subset of the plurality of sets of best practice graphs, the user graph representing the received information describing the configuration of resources;

identifying, based at least in part on the comparison, an ideal best practice graph of the plurality of sets of best practice graphs that most closely matches the user graph; and providing to the user, based at least in part on the identified ideal best practice graph, information associated with operation of the configuration of resources.

8. The computer-implemented method of claim 7, further comprising receiving each of the sets of best practice graphs from each respective different distributed computing system.

9. The computer-implemented method of claim 7, further comprising generating the user graph based at least in part on at least one of a role or a significance of a resource instance from the configuration of resources.

10. The computer-implemented method of claim 7, wherein the received information is based at least in part on an application stack associated with the configuration of resources.

11. The computer-implemented method of claim 7, further comprising:
   storing arbitrary graphs that represent testing scenarios; and
   comparing the user graph with at least a portion of the stored arbitrary graphs.

12. The computer-implemented method of claim 7, wherein the plurality of sets of best practice graphs include at least predefined operating scenarios for at least one of the respective different distributed computing systems, and forming at least one best practice graph based at least in part on an availability risk profile associated with a result of a test of the predefined operating scenario.

13. A system for resource availability management, comprising:
   at least one memory that stores computer-executable instructions; and
   at least one processor configured to access the at least one memory, wherein the at least one processor is configured to execute the computer-executable instructions to:
      store one or more curated models for each distributed system of a subset of a plurality of distributed systems;
      receive information obtained from operation of at least one computing resource;
      generate, based at least in part on the received information, a relative usage model for the at least one computing resource;
      compare the relative usage model with one or more curated models to identify at least one ideal curated model of the one or more curated models; and
      provide to a user associated with the at least one computing resource, based at least in part on each of a subset of the identified at least one ideal curated models, operating information associated with the at least one computing resource.

14. The system of claim 13, wherein at least one of a role or a significance of the at least one computing resource is inferred based at least in part on the received information.

15. The system of claim 13, wherein the at least one computing resource of the distributed system comprises a resource instance of at least one environment of the plurality of distributed systems.

16. The system of claim 15, wherein the comparison of the relative usage model with the one or more curated models to identify at least one ideal curated model comprises (i) identifying the ideal curated model for an intermediate model that is isomorphic with the relative usage model or is isomorphic with a derivative model of the relative usage model, or (ii) manually identifying the ideal curated model for an intermediate model and automatically assigning subsequent ideal curated models based at least in part on the manually identified ideal curated model.

17. The system of claim 13, wherein the at least one computing resource is associated with at least one distributed systems of the subset of the plurality of distributed systems.

18. The system of claim 13, wherein the provided operating information associated with the at least one computing resource includes at least one of an availability risk for the at least one computing resource, a recommendation to remediate an availability risk of the at least one computing resource, an instruction to remediate an availability risk of the at least one computing resource, or a recommendation to operate the at least one computing resource in a second distributed system of the plurality of distributed systems.

19. One or more non-transitory computer-readable media collectively storing computer-executable instructions for resource availability management that, when executed by one or more processors, configures the one or more processors to perform operations comprising:
   generating, based at least in part on information associated with a plurality of service provider environments, a virtual environment associated with at least one of the plurality of service provider environments;
   receiving operational information obtained from operating at least one distributed resource;
   evaluating, based at least in part on the generated virtual environment, the received operational information; and
   providing to a user associated with the at least one distributed resource, based at least in part on the evaluation, operating information associated with the at least one distributed resource.

20. The one or more non-transitory computer-readable media of claim 19, wherein the received operational information comprises at least one of role or relative significance for the at least one distributed resource.

21. The one or more non-transitory computer-readable media of claim 19, wherein the at least one distributed resource comprises a virtual machine instance.

22. The one or more non-transitory computer-readable media of claim 19, wherein the at least one distributed resource is from at least one of the plurality of service provider environments or a distributed environment different from a system of the plurality of service provider environments.

23. The one or more non-transitory computer-readable media of claim 19, wherein evaluating the received operational information comprises simulating the distributed resource in the generated virtual environment associated with at least one of the plurality of service provider environments.

24. The one or more non-transitory computer-readable media of claim 19, wherein the provided operating information associated with the at least one distributed resource comprises a recommendation for operating the distributed resource in at least one of the plurality of service provider environments.

25. The one or more non-transitory computer-readable media of claim 19, wherein the instructions further configure the one or more processors to perform operations comprising:
   receiving a user-defined performance metric; and
   indicating, based at least in part on the evaluation, when the performance metric is met at a cost below a particular level.

* * * * *